US012668235B1

(12) United States Patent
Chang et al.

(10) Patent No.: US 12,668,235 B1
(45) Date of Patent: Jun. 30, 2026

(54) MACHINE-LEARNED COST ESTIMATION IN TREE SEARCH TRAJECTORY GENERATION FOR VEHICLE CONTROL

(71) Applicant: Zoox, Inc., Foster City, CA (US)

(72) Inventors: Yan Chang, Sunnyvale, CA (US); Alec Jacob Farid, Commack, NY (US); Sutej Pramod Kulgod, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 266 days.

(21) Appl. No.: 18/540,642

(22) Filed: Dec. 14, 2023

(51) Int. Cl.
B60W 30/09 (2012.01)

(52) U.S. Cl.
CPC ................................... B60W 30/09 (2013.01)

(58) Field of Classification Search
CPC ...................................................... B60W 30/09
See application file for complete search history.

(56) References Cited

U.S. PATENT DOCUMENTS

| | | | |
|---|---|---|---|
| 10,649,459 B2 | 5/2020 | Wang | |
| 2021/0370972 A1 | 12/2021 | Bagschik | |
| 2022/0176995 A1 | 6/2022 | Subramanian | |

| | | | |
|---|---|---|---|
| 2023/0041975 A1 | 2/2023 | Caldwell | |
| 2024/0199083 A1* | 6/2024 | Chang | B60W 50/0097 |
| 2025/0148920 A1* | 5/2025 | Aksun Guvenc | B60W 60/001 |
| 2025/0162612 A1* | 5/2025 | Woelki | B60W 60/00274 |

OTHER PUBLICATIONS

U.S. Appl. No. 16/407,139, filed May 8, 2019.
U.S. Appl. No. 16/581,632, filed Sep. 24, 2019.
U.S. Appl. No. 16/779,576, filed Jan. 31, 2020.
U.S. Appl. No. 18/084,419, filed Dec. 19, 2022.

* cited by examiner

*Primary Examiner* — Daniel M. Robert
(74) *Attorney, Agent, or Firm* — Lee & Hayes, P.C.

(57) ABSTRACT

A machine-learned architecture for estimating the cost to operate from a prediction node of a tree search for exploring candidate operations for controlling a vehicle may be trained using a loss function that mitigates the deleterious effects of training without infinitely searching the tree or reaching convergence. A first loss of the loss function term may be based on a difference between the architecture's estimated cost to go from a starting position and the cost to go from the starting position determined by the search so far. A second loss term may be based on the difference between the model's estimate of the cost to go from a predicted state and may be adjusted based on (1) weighting based on a convergence-based weight and/or (2) adjusting the second loss term using an approximation of a difference between a cost of the current cheapest action and the globally optimal action.

20 Claims, 8 Drawing Sheets

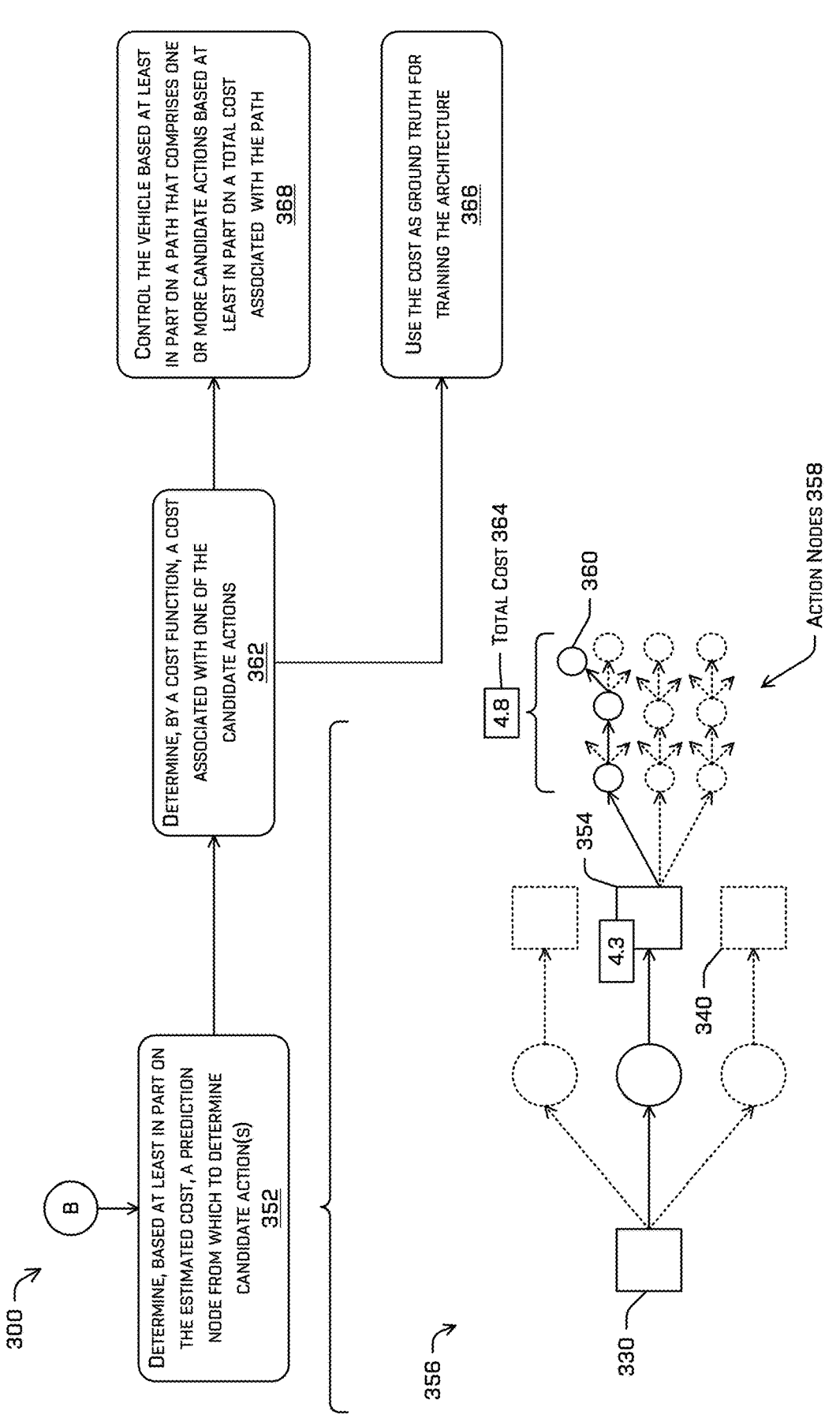

DETERMINE, BASED AT LEAST IN PART ON THE ESTIMATED COST, A PREDICTION NODE FROM WHICH TO DETERMINE CANDIDATE ACTION(S) 352

DETERMINE, BY A COST FUNCTION, A COST ASSOCIATED WITH ONE OF THE CANDIDATE ACTIONS 362

CONTROL THE VEHICLE BASED AT LEAST IN PART ON A PATH THAT COMPRISES ONE OR MORE CANDIDATE ACTIONS BASED AT LEAST IN PART ON A TOTAL COST ASSOCIATED WITH THE PATH 368

USE THE COST AS GROUND TRUTH FOR TRAINING THE ARCHITECTURE 366

TOTAL COST 364

ACTION NODES 358

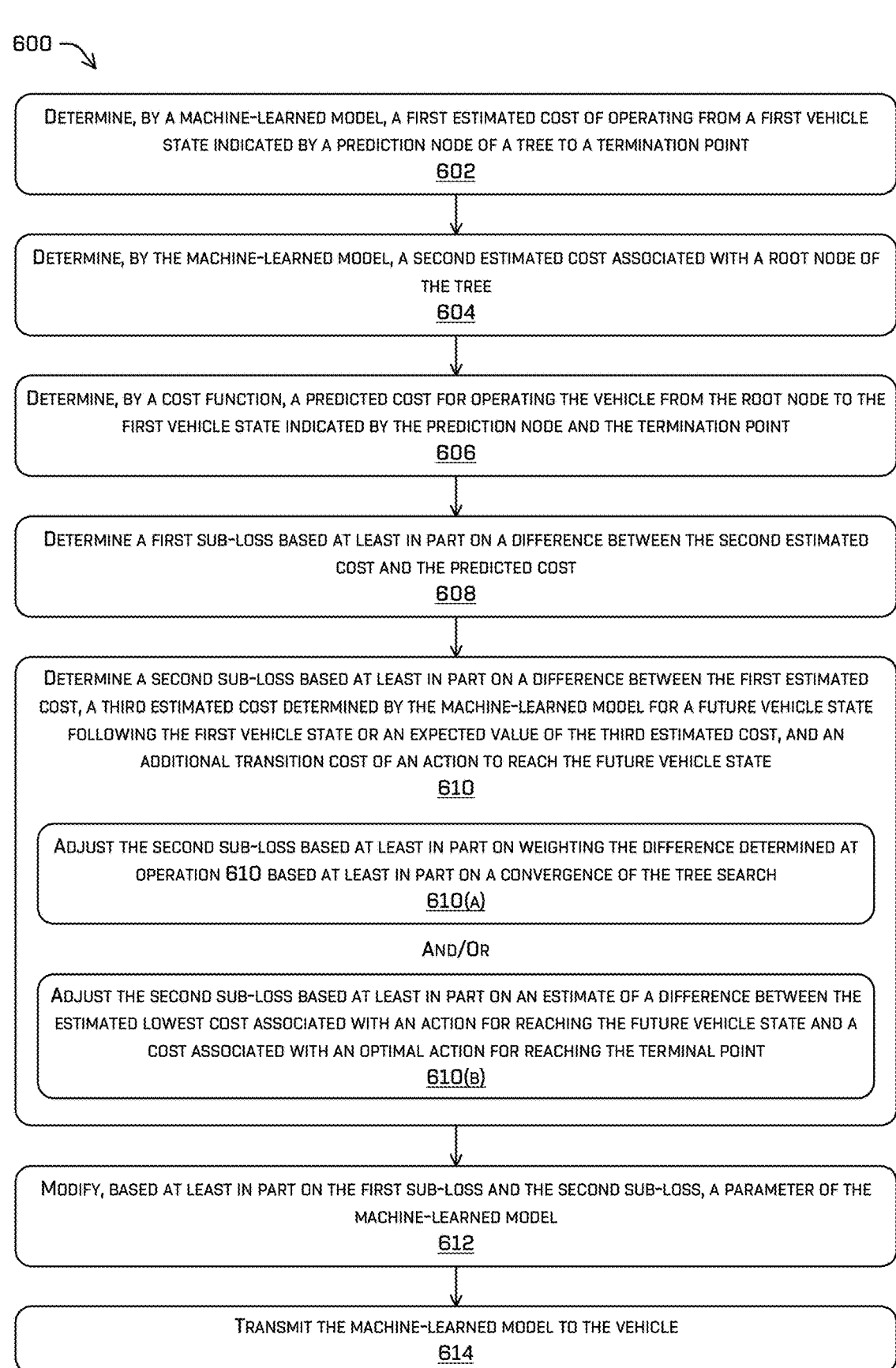

DETERMINE, BY A MACHINE-LEARNED MODEL, A FIRST ESTIMATED COST OF OPERATING FROM A FIRST VEHICLE STATE INDICATED BY A PREDICTION NODE OF A TREE TO A TERMINATION POINT
602

DETERMINE, BY THE MACHINE-LEARNED MODEL, A SECOND ESTIMATED COST ASSOCIATED WITH A ROOT NODE OF THE TREE
604

DETERMINE, BY A COST FUNCTION, A PREDICTED COST FOR OPERATING THE VEHICLE FROM THE ROOT NODE TO THE FIRST VEHICLE STATE INDICATED BY THE PREDICTION NODE AND THE TERMINATION POINT
606

DETERMINE A FIRST SUB-LOSS BASED AT LEAST IN PART ON A DIFFERENCE BETWEEN THE SECOND ESTIMATED COST AND THE PREDICTED COST
608

DETERMINE A SECOND SUB-LOSS BASED AT LEAST IN PART ON A DIFFERENCE BETWEEN THE FIRST ESTIMATED COST, A THIRD ESTIMATED COST DETERMINED BY THE MACHINE-LEARNED MODEL FOR A FUTURE VEHICLE STATE FOLLOWING THE FIRST VEHICLE STATE OR AN EXPECTED VALUE OF THE THIRD ESTIMATED COST, AND AN ADDITIONAL TRANSITION COST OF AN ACTION TO REACH THE FUTURE VEHICLE STATE
610

ADJUST THE SECOND SUB-LOSS BASED AT LEAST IN PART ON WEIGHTING THE DIFFERENCE DETERMINED AT OPERATION 610 BASED AT LEAST IN PART ON A CONVERGENCE OF THE TREE SEARCH
610(A)

AND/OR

ADJUST THE SECOND SUB-LOSS BASED AT LEAST IN PART ON AN ESTIMATE OF A DIFFERENCE BETWEEN THE ESTIMATED LOWEST COST ASSOCIATED WITH AN ACTION FOR REACHING THE FUTURE VEHICLE STATE AND A COST ASSOCIATED WITH AN OPTIMAL ACTION FOR REACHING THE TERMINAL POINT
610(B)

MODIFY, BASED AT LEAST IN PART ON THE FIRST SUB-LOSS AND THE SECOND SUB-LOSS, A PARAMETER OF THE MACHINE-LEARNED MODEL
612

TRANSMIT THE MACHINE-LEARNED MODEL TO THE VEHICLE
614

FIG. 6

MACHINE-LEARNED COST ESTIMATION IN TREE SEARCH TRAJECTORY GENERATION FOR VEHICLE CONTROL

BACKGROUND

An autonomous vehicle may fail to navigate accurately and/or efficiently when normative operating conditions are altered, such as when roadway indicators are obscured (e.g., by snow, garbage, sand), degraded (e.g., burned out light, worn out lane markings), and/or invalidated (e.g., an obstruction partially blocks a lane, traffic signage and/or traffic cones indicate an alternate lane that conflicts with original lane markings). Moreover, various environmental factors and human and animal behavior may be erratic or unpredictable, which may further make autonomous vehicle navigation difficult. Existing solutions for dealing with non-standard driving conditions can be so computationally intensive that they may not be feasible for real-time vehicle operation on consumer grade hardware and/or at normal urban driving speeds.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIGS. 3A-3C illustrate a pictorial flow diagram of an example process for generating a path for controlling an autonomous vehicle using a tree search that employs an estimated cost determined by the cost estimate architecture. They also depict a process for verifying a trajectory and/or generating ground truth data for training the cost estimate architecture.

FIG. 6 depicts a flow diagram of an example process for training a cost estimate architecture using a loss function that mitigates the effects of not searching the tree to an infinite horizon and/or using unconverged values to train the cost estimate architecture.

DETAILED DESCRIPTION

Figure 1:
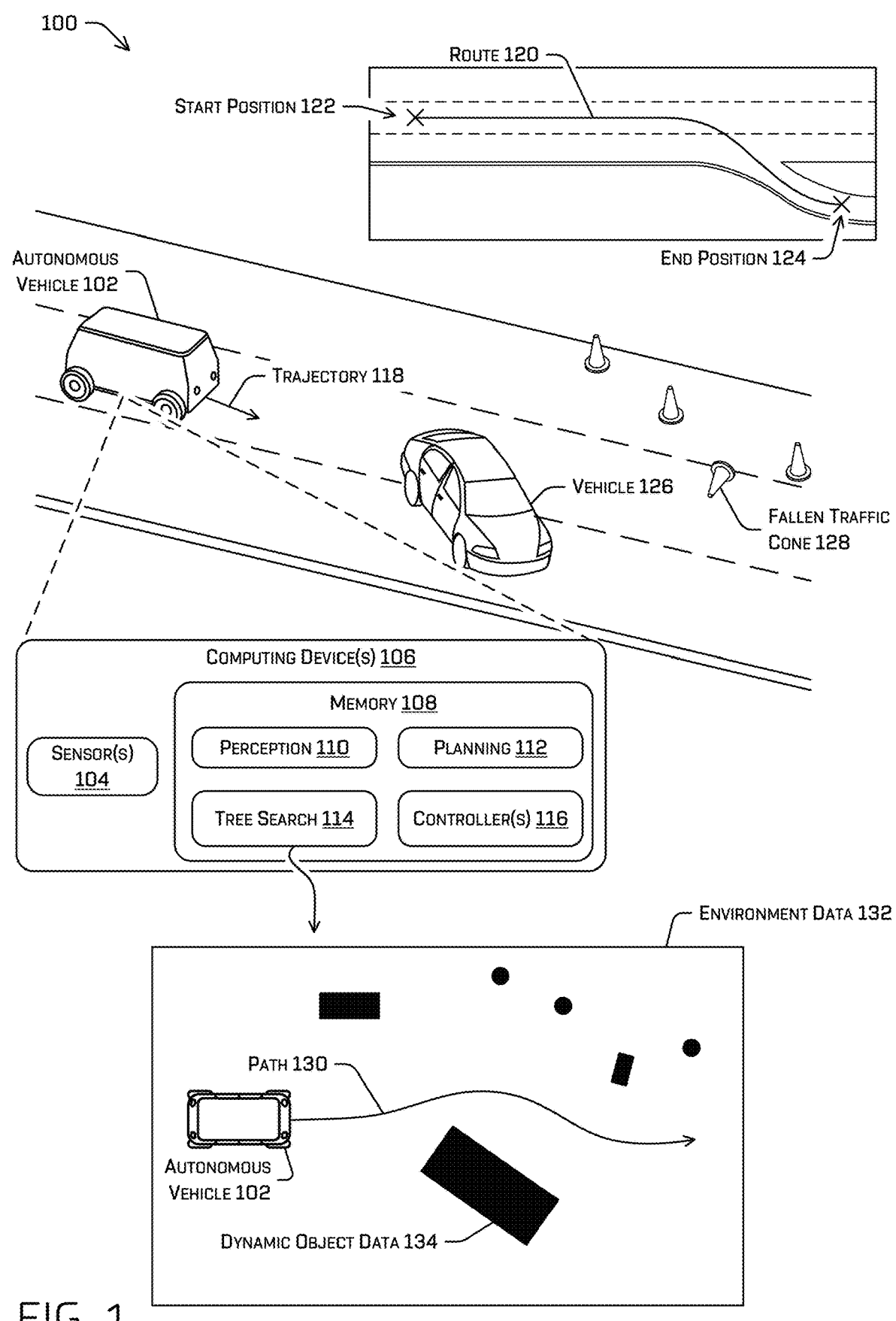
FIG. 1 illustrates an autonomous vehicle and an example scenario in which lane references (whether previously mapped or detected) may not be reliable for determining instructions for controlling motion of the vehicle.

As discussed above, autonomous vehicle control schemas may be inefficient in some instances, such as when circumstances demand that a vehicle leave a lane, navigate an unmarked area or an area where lane markings are absolute, and/or the like. Reliance on such more rigid systems may cause the autonomous vehicle to completely lane change, change routes, and/or need to transmit a request for help from a remote operator (or "teleoperator"), rather than a more nuanced approached such as slightly leaving a lane or moving towards an edge of a lane to pass an object.

The techniques discussed herein may include an autonomous vehicle guidance system that generates a path for controlling an autonomous vehicle based at least in part on a tree search technique that alternately determines, from among multiple potential future states of the vehicle and/or environment, a future state from which to explore difference subsequent candidate actions for the vehicle to execute. The tree search may use a cost function to determine a cost associated with a predicted state and/or candidate action that starts at the predicted state and/or reaches the predicted state. A cost may indicate the relative safety, amount of progress made along a route, comfort of a passenger, or the like associated with a candidate action and/or future state. For example, a higher cost could be less safe, make less progress along a route, and/or cause more discomfort to a passenger of the vehicle. In some examples, determining the cost using the cost function may include simulating execution of a candidate action and/or future states of dynamic object(s) and/or the environment, which may be time consuming and computationally intensive. For example, to determine a first predicted state to further explore (to assess whether candidate action(s) to get to or from that state are feasible or a lower cost than a different predicted state), cost(s) associated with a series of action(s) and/or predicted state(s) before and/or after that predicted state may be determined until an endpoint is reached, such as a horizon time along a route, to determine the cost associated with that first predicted state. However, this process may be prohibitively computationally intensive and may introduce unacceptable latency to the process for controlling operations of the vehicle.

The techniques discussed herein include a machine-learned architecture for estimating a cost for a prediction node. This estimated cost may indicate an estimate of the cost to operate the vehicle from a state indicated by the prediction node to a next future state or operate the vehicle from the state indicated by the prediction node until a termination point associated with the tree search, such as a certain amount of time into the future or a distance from the current state of the vehicle. For example, the estimated cost may indicate an estimate of the lowest cost of moving from the state indicated by the prediction node up to a next time step in the tree search or all the way to some termination point. The tree search may then use estimated costs associated with different prediction nodes to select a prediction node for further exploration, such as by determining actions that can be taken from the selected prediction node. This may replace randomly selecting different prediction nodes to test the candidate actions that can be taken from those prediction nodes to find a lower cost action to take and/or exploring a high percentage of the tree to find a reasonable solution.

The cost to operate (e.g., move, stop, turn) from a state indicated by a prediction node to another further future state or to a termination point in the tree search may be called a "cost to go" from the prediction node. The machine-learned architecture discussed herein is trained to estimate this cost to go. Such a cost to go may be useful in predicting the total cost associated with a trajectory associated with the tree to make a more informed decision of how to expand the tree to a final horizon.

However, training a machine-learned model (e.g., cost estimation architecture/architecture 234) to predict the cost to go is complicated by a number of things. Firstly, it is difficult to the point of being computationally impossible, in some cases, to determine the true optimal action and, accordingly, which prediction node would be best to choose next. If the optimal action were known, the prediction node determined at each layer of the tree search would facilitate executing the optimal action at each layer. Determining the optimal action may be computationally difficult or impossible because it could require infinitely exploring the tree search or at least exploring the tree search until a set of parameters is well-converged (e.g., converged enough to rely on the results, such as by determining that a range between parameters is less than a threshold). However, determining whether a tree search is converged enough is in itself a difficult problem and even if this is known, reaching that point is still prohibitively computationally expensive. Accordingly, training the machine-learned model discussed herein may be left without reliable ground truth to accurately train the model. Moreover, capping the tree search to not infinitely explore the tree search may require accounting for the costs that weren't determined past the point at which the tree search was capped. In some cases, to account for these undetermined costs, a terminal cost may be determined for the deepest node in the tree search and added to the predicted cost(s) determined herein for reaching that deepest node in the tree search. However, this terminal cost may skew the training of the machine-learned model discussed herein such that the estimated cost to go determined by the model may become increasingly inaccurate deeper into the tree search. For example, during training, as the model is determining estimated costs that are compared to a ground truth that is based on this estimated or heuristic cost, the losses determined as part of the training may be overly influenced by this terminal cost, causing the machine-learned model to perform more inaccurately as the tree search progresses to greater depth in the tree search.

The techniques discussed herein comprise a loss function that overcomes and/or reduces the effects of these problems and thereby increases the accuracy of the machine-learned model's learned cost to go. In a situation where multiple prediction nodes have been generated for a particular time step between a current time and a future time associated with a termination point for the tree search, the machine-learned model may determine an estimated cost to go for one or more of these prediction nodes and the tree search may use the estimated cost(s) to go to determine which prediction node to generate candidate actions for (e.g., by choosing the prediction node with the minimum estimated cost to go). Making the estimated cost to go allows the tree search to determine a prediction node from which to explore potential actions that may be more likely to be close to the optimal action. This allows the tree search to operate more quickly, with less returns to a previous layer to try a new prediction node to explore candidate actions from, and reduces the memory and computational processing used by the tree search and the machine-learned model.

More specifically, this loss function is used as part of training the machine-learned model to determine an estimated cost to go for a prediction node. This loss function comprises a first sub-loss and a second sub-loss that may be summed together as the loss and the loss may be used as part of gradient descent to adjust one or more parameter(s) or the machine-learned model to reduce the loss for a particular trace from a root node of the tree search to a current prediction node of the tree search (e.g., a prediction node that has been selected for cost to go estimate determination). The first sub-loss may mitigate and/or resolve inaccuracies caused by searching deeper into the tree and the second sub-loss may mitigate and/or resolve inaccuracies attributable to the inability to infinitely search the tree or determine whether the tree search has converged to a sufficient degree. The first sub-loss may comprise determining a sub-loss based at least in part on a difference between an estimated cost to go determined by the machine-learned model for the root node of the tree search and the upper bound cost to go determined for the root node according to the upper bound determination discussed herein. The second sub-loss may be determined in one of multiple ways, some of which are described below.

The upper bound cost associated with a prediction node may be the lowest calculated cost of reaching the termination point from a state indicated by the prediction node. The estimated cost determined by the machine-learned model discussed herein may be an estimate of the upper bound cost for a prediction node. However, the techniques discussed herein may also include determining an upper bound cost for a prediction node based at least in part on selecting the prediction node for exploration/expansion/rollout. This calculated upper bound cost may be used to update the upper bound cost associated with the prediction node from the estimated cost to the calculated upper bound. As an example, such an upper bound cost may be modified based on additional information acquired during exploration of the tree.

Determining the upper bound may comprise determining different candidate actions that could be taken from a state indicated by the prediction node for which the upper bound is being determined and, for a first candidate action of those candidate actions, determining a predicted cost of reaching the termination point if that first candidate action was implemented by the vehicle. The upper bound cost is defined as the lowest predicted cost from among the predicted costs determined for the candidate actions that could be taken from the state indicated by the prediction node. The prediction cost for the first candidate action may be determined by summing a transition cost associated with the first candidate action with a total of the costs incurred by taking a default action at each time step after the candidate action up to the termination point. The default action may include, for example, repeating the first candidate action, maintaining an action indicated by the first candidate action (e.g., continue turning, continue braking), maintaining operation in a same lane associated with a future state that would be achieved by the first candidate action, and/or the like.

A cost function may determine the transition cost for an action based at least in part on determining a safety score, progress score, and/or comfort score associated with the action. For example, determining the transition cost may comprise determining a weighted sum of a sub-cost determined based at least in part on a safety of the action, a sub-cost determined based at least in part on how far the action makes progress along a route or towards a goal (e.g., reaching a parked state), a sub-cost determined based at least in part on passenger comfort associated with the action. Of course, any other cost or combination thereof is contemplated.

A lower bound cost associated with a prediction node may indicate the lowest calculated cost of moving from the state indicated by the prediction node. In some examples, determining the lower bound cost to go for a prediction node may comprise determining the total of transition cost(s) determined for a series of actions that start at the prediction node. This series may include a single action or multiple actions, where the end of one action is the beginning of a next action in the multiple actions. Accordingly, in an example where the series includes just one action, the total cost of that series would just be the transition cost of that action to reach a subsequent predicted state. In other words, the lower bound cost indicates the lowest cost to move from the prediction node as has been calculated so far in the tree search.

In a first example, the second sub-loss may be based at least in part on a difference between an estimated cost to go determined by the machine-learned model for the current prediction node and a difference between a weighted estimated cost to go from the next prediction node and the cost to transition to the next prediction node. The weight for the weighted estimated cost to go from the next prediction node may be determined based at least in part on an extent to which the tree search has converged. This weight may be determined based at least in part on a difference between the upper bound cost to go and lower bound cost to go for the current prediction node. In the second example, In a second example, the second sub-loss may be based at least in part on a difference between an estimated cost to go determined by the machine-learned model for the current prediction node and a difference between estimated cost to go from the next prediction node (e.g., in a further node down the tree) and the cost to transition to the next prediction node plus an estimate of how different the cost for transitioning to the next prediction node is from the cost associated with the truly optimal action (e.g., the action that would produce the absolute lowest cost in accordance with, for example, safety, progress, and comfort metrics). This estimate of the difference between the cost to transition to the next prediction node and the cost associated with the truly optimal action may be approximated by determining a number between the upper bound cost to go and lower bound cost to go determined for the current prediction node. This number may be determined by multiplying a fixed constant by the range between the upper bound and the lower bound or may be randomly sampled from the values between the upper bound and the lower bound. Determining the upper bound cost to go and lower bound cost to go is discussed in more detail at least in the discussion regarding FIG. 5.

In some examples, the machine-learned model may be used for determining an estimated cost to go associated with a predicted state so that the tree search may select a predicted state that has a lowest estimated cost for exploration. For example, the tree search may use the lowest cost predicted state to determine candidate action(s) that start at that predicted state. In some examples, the tree search may determine the predicted state it will explore based at least in part on determining that the predicted state is associated with a lowest estimated cost, an estimated cost that is less than threshold, or an estimated cost that is less than n other estimated costs of different predicted states, where n is a positive integer. A path may comprise series of candidate actions for achieving a series of predicted states.

In some examples, the machine-learned model may determine the estimated cost to go based at least in part on a track and/or a current vehicle state associated with the autonomous vehicle, dynamic object data (which may include track(s) of dynamic object(s)), and/or environment state data). A track may identify a historical and/or current pose (e.g., position and/or orientation), velocity, acceleration, object classification (this may or may not be immutable—e.g., the classification "vehicle" is likely to be immutable, whereas "cyclist" may alter since a cyclist may dismount and become a pedestrian), etc. of a detected object or of the vehicle itself. In some examples, a perception component may determine the dynamic object data based at least in part on sensor data. A dynamic object may be an object detected as moving, having moved, and/or being associated with an object classification associated with objects capable of movement. In some examples, another machine-learned model may determine a static object map (e.g., a map indicating space occupied by static object(s) and/or "free space" in an environment) and/or one or more dynamic object maps (e.g., a map indicating a likelihood that a location in the environment will be occupied by a moving object or a stationary object that may move at a future time). These map(s) may be used for a cost determination portion of the tree search executed by the vehicle guidance system, such as determining an upper bound cost to go, lower bound cost to go, and/or transition cost associated with an operation to change states from a prediction node to a further future prediction node.

In some examples, a static object detection detected from sensor data may be included as part of the environment state data. The environment state data may further include map data that may have previously been generated that indicates the location and/or classification of roadways, lanes, signage, buildings, permanent objects, construction, known occlusion data, route generated by the vehicle (e.g., start position, end position, roadways to be used), etc.

The tree search discussed herein may alternately determine a candidate action and a predicted state of the environment associated with (e.g., at least partially responsive to) the candidate action at a future time step, another candidate action based on the predicted state of the environment, a second predicted state of the environment associated with the additional candidate action at a further future time step, and so on, up to a time horizon or a specified number of actions. A candidate action may indicate, for example, a trajectory for controlling motion of the vehicle, activating emitters of the vehicle (e.g., a turn signal, a headlight, a speaker), and/or the like. Each candidate action may be associated with a different action node and each predicted environment state may be associated with a prediction node of the tree.

As an initial operation, the tree search may determine, based at least in part on sensor data, a current state of an environment associated with the autonomous vehicle, which may include dynamic objects and/or static objects. This initial state may be associated with a root node. The root node may be a prediction node, in at least one example, or otherwise associated with a current state of the environment and/or vehicle. The state of the environment may be indicated by a data structure associated with the root node/prediction node, in some examples.

Using this initial state, the tree search may determine one or more future states associated with different prediction nodes for exploration. Exploration may entail determining further prediction nodes and/or candidate actions based on the prediction nodes selected for exploration. A future state may be reached by one or more candidate actions. A candidate action may comprise a coarse maneuver, such as "stay in same lane," "lane change left," "execute right turn," "stop," or the like; and/or fine instructions such as a curve that defines and/or is associated with a position, steering angle, steering rate, velocity, and/or acceleration for the vehicle controller to track. In some examples, determining the one or more candidate actions for exploration may comprise transmitting the initial environment state (or the state that is indicated by a particular prediction node of a branch that is being explored at predictions nodes deeper than the initial node) to the planning component of the vehicle and receiving the set of candidate actions from the planning component and/or future state(s) that would result from those candidate actions.

In some examples, each candidate action may be associated with its own action node in the tree search. For example, a candidate action may be associated with an action node that is dependent on the root node, which indicates the state upon which the candidate action was based. The action node may, in some examples, identify the representative candidate action or, in other examples, the action node may indicate the representative and the two or more candidate actions associated therewith.

The tree search may additionally or alternatively determine a cost associated with a candidate action and/or a future state indicated by a prediction node. This cost may be based at least in part on a prediction of how close the candidate action and/or future state would cause the autonomous vehicle to pass static object(s) and/or dynamic object(s); a proximity of the autonomous vehicle to non-drivable surface(s); a velocity, acceleration, and/or jerk associated with the candidate action; a short-term goal cost (e.g., displacement/progress along a route, parking, achieving a soft objective indicated by a teleoperations device i.e., an objective that the autonomous vehicle is not required to meet but is factored into the cost determination to increase a likelihood of the autonomous vehicle operating in a particular manner), etc. In some examples, a cost to go from a prediction node may be updated based at least in part on subsequently determined transition costs associated any candidate action(s) determined subsequent to the prediction node. For example, the upper and/or lower bound cost to go from a prediction node may be updated based on the costs that are determined for actions subsequent in time to the state indicated by the prediction node.

The techniques discussed herein may reduce the computational load and latency for determining a path for controlling an autonomous vehicle, such as by generating estimated costs instead of using simulation to determine a more exact cost or by waiting until the tree search reaches convergence. This may allow the techniques discussed herein to be run real-time on consumer grade hardware. The techniques may decrease the number of candidate actions explored to find a feasible, safe, and efficient path, where a path may be sequential candidate actions that form a contiguous series. This decrease in computational load and/or latency may allow the planning component to increase the granularity with which the autonomous vehicle can be controlled and may increase the number of scenarios that the autonomous vehicle can successfully and safely navigate. The techniques may also automatically generate accurate ground truth data with little to no human intervention and/or may automatically re-train the cost estimation architecture when the cost function is updated since the ground truth data may be automatically updated. This allows the system further autonomy and insight, since factors into the cost function are known. This is important because, traditionally, machine-learned model offer no insight into why they're generating an output.

Example Scenario

FIG. 1 illustrates an example scenario 100 including a vehicle 102. In some examples, the example scenario 100 may be a real-world scenario and/or the example scenario 100 may be a representation of a real-world scenario modeled as a simulated scenario. In examples where the example scenario 100 is a simulated scenario, the example scenario 100 may be determined based at least in part on input received at a user interface of a computing device (e.g., a user of the computing device may define the environment, objects therein, and/or characteristics thereof) and/or the example scenario 100 may be based at least in part on log data received from one or more autonomous vehicles. The log data may be based at least in part on sensor data received at an autonomous vehicle, perception data generated by a perception component, and/or instructions generated by a planning component. In some examples, the autonomous vehicle may store the log data and/or periodically transmit the log data to a remote computing device.

In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein and an example where scenario 100 is a real-world example, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, and/or other depth-sensing sensor), an image sensor (e.g., a camera), an audio sensor (e.g., a microphone), and/or environmental sensor (e.g., a barometer, a hygrometer, etc.). In some examples, a simulated sensor may correspond with at least one of the sensor(s) 104 on the vehicle 102 and in a simulation, one or more of sensor(s) 104 may be simulated. In some examples, the position of a simulated sensor may correspond with a relative position of one of the sensor(s) 104 to the vehicle 102.

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, tree search 114, and/or controller(s) 116. In some examples, the planning component 112 may comprise the tree search 114 and a cost function that may be part of the tree search 114. The perception component 110, the planning component 112, the tree search 114, and/or the controller(s) 116 may include one or more machine-learned (ML) models and/or other computer-executable instructions. For example, the tree search 114 may comprise the cost estimation architecture discussed herein.

In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or a path generated by the tree search 114. The trajectory 118 may be one of the candidate actions determined by the tree search 114.

The trajectory 118 may comprise instructions for controller(s) 116 of the autonomous vehicle 102 to actuate drive components of the vehicle 102 to effectuate a steering angle and/or steering rate, which may result in a vehicle position, vehicle velocity, and/or vehicle acceleration that tracks the path generated by the guidance system. For example, the trajectory 118 may comprise a target heading, target steering angle, target steering rate, target position, target velocity, and/or target acceleration for the controller(s) to track as part of the path. For example, the coarse path generated by the tree search 114 according to the techniques discussed herein may indicate vehicle positions, headings, velocities, and/or entry/exit curvatures at 500 millisecond time intervals and a smooth path output by the tree search 114 may comprise such points at a 10 or 100 millisecond interval, which may correspond to a time interval associated with the trajectory 118. In some examples, the controller(s) may comprise software and/or hardware for actuating drive components of the vehicle 102 sufficient to track the trajectory 118 (and/or path, which may comprise multiple trajectories in one example).

In the example scenario 100, the autonomous vehicle 102 has received and/or determined a route 120 defining a start position 122, an end position 124, and a curve between the start position 122 and the end position 124 (note that the curve comprises a straight line and/or one or more curves). For example, the planning component 112 may have determined the route 120 based at least in part on sensor data and an end position received as part of a mission (e.g., from a passenger, from a command center). As used herein, references to a "position" may comprise both a location and/or a pose (e.g., position and/or orientation/heading of the vehicle). In some examples, the route may not comprise end position 124 and may additionally or alternatively comprise a target position, such as a target lane, target relative position (e.g., 10 feet from roadway edge), target object (e.g., follow vehicle, follow passenger, move toward an individual hailing the vehicle), etc.

As the vehicle operates to reach the end position 124, the autonomous vehicle 102 may encounter a scenario like example scenario 100 in which a planner that is reliant on a lane reference (e.g., a relative spatial designation determined based at least in part on a map and/or localizing the autonomous vehicle 102) to generate a path may not accurately and/or efficiently generate a path. For example, a variety of objects (e.g. a blocking vehicle 126, fallen traffic cone 128) cumulatively block all three lanes of the depicted roadway, which may cause another planner to stop the vehicle and/or call teleoperations because no one lane has sufficient room for the autonomous vehicle.

However, the tree search 114 discussed herein may generate a path 130 based at least in part on environment data 132, map data, and/or dynamic object data 134 that may be based at least in part on sensor data captured by sensor(s) 104 and/or retrieved from memory. In some examples, the trajectory 118 may be apart of path 130. For example, the trajectory 118 may have been a candidate action that was part of the tree search and that was ultimately determined for inclusion in the path 130 according to the cost determinations discussed herein. In some examples, the perception component 110 may determine the dynamic object data 134 based at least in part on the sensor data and may determine part of the environment data 132, in some cases, such as light states of traffic lights indicated in the map data, static object data that isn't indicated in the map data (e.g., movable inanimate objects, newly erected/constructed objects, construction zones). Static data, whether as part of the map data or the environment data 132, may indicate a likelihood that an object exists at a location in the environment, a classification associated with the object (e.g., signage, movable static object) and the dynamic data may indicate a likelihood that an object occupies or will occupy a location in the environment. In some instances, the dynamic data may comprise multiple frames associated with different times steps at intervals up to a prediction horizon (i.e., a maximum time/distance for which dynamic data is predicted). In some examples, the tree search 114 may always be running on the vehicle, i.e., the guidance system may be the nominal planning component, or, in an alternate example, the tree search 114 may be a contingent planning component or a planning component for special circumstances (e.g., when a nominal planning component isn't able to find a valid path).

In some examples, the perception component 110 may receive sensor data from the sensor(s) 104 and determine data related to objects in the vicinity of the vehicle 102, such as the static and/or dynamic data. The depicted example of the environment data 132 comprising static and/or dynamic data is a top-down representation of such data, but any representation of the static and/or dynamic data is contemplated, such as a heat map, object classifications associated with detected objects, instance segmentation(s), semantic segmentation(s), two and/or three-dimensional bounding boxes, tracks, etc. The perception component 110 may additionally or alternatively determine route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), track data (e.g., object detections and/or tracks discussed herein), etc.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise radar data, which the perception component 110 may receive as input. The perception component 110 may be configured to detect as many objects and information about the environment as possible to avoid failing to account for an event or object behavior that should be taken into account by the planning component 112 in determining the trajectory 118.

The object classifications (which may be part of the environment data 132, dynamic object data 134, and/or map data) may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading, although in some examples the track may indicate current and historical characteristics detected in association with an object. In some examples, the perception component 110 may comprise a prediction component that may determine the predicted portion of the track, which may comprise a predicted position, heading, steering rate, velocity, acceleration, classification (for those classifications that are malleable, such as cyclists that may become pedestrians), etc. The prediction component may comprise a simulation component, machine-learned model, or in additional or alternate examples, the prediction component may comprise a Kalman filter or the like. The perception component 110 may be used to determine the environment state indicated by a prediction node as part of the tree search discussed herein. For example, the environment state may comprise current and/or predicted environment data 132.

The data produced by the perception component 110 may be collectively referred to as perception data. Once/as the perception component 110 generates perception data, the perception component 110 may provide the perception data to the planning component 112 and/or the tree search 114. In some examples, perception data may comprise outputs of sensor specific pipelines (e.g., vision, lidar, radar) and/or hybrid sensor pipelines (e.g. vision-lidar, radar-lidar).

The planning component 112 may use the perception data received from perception component 110 and/or a path received from the tree search 114, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; determine a smooth trajectory from a coarse trajectory received from the tree search 114; generate, substantially simultaneously and based at least in part on the path and perception data and/or simulated perception data (which may further include predictions regarding detected objects in such data), a plurality of potential trajectories for controlling motion of the vehicle 102 in accordance with a receding horizon technique (e.g., 1 micro-second, half a second, 2 seconds, 5 seconds, 10 seconds, or any other near-term time period) to control the vehicle to traverse the route (e.g., in order to avoid any of the detected objects); and select one of the potential trajectories as a trajectory 118 of the vehicle 102 that may be used to generate a drive control signal that may be transmitted to the controller(s) 116 for actuating drive components of the vehicle 102. FIG. 1 depicts an example of such a trajectory 118, represented as an arrow indicating a target heading, target steering angle, target steering rate, target position, target velocity, and/or target acceleration for the controller(s) to track, although the trajectory itself may comprise instructions for controller(s), which may, in turn, actuate a drive system of the vehicle 102.

In some examples, the tree search 114 may be a component of the planning component 112. In some examples, the planning component 112 may generate the one or more candidate actions for the tree search discussed herein and associated with action node(s). The planning component 112 may receive a trajectory or path from the nominal guidance system and may receive the path generated by the tree search 114 as discussed herein. That path received from the tree search 114 may be treated by the planning component 112 as a contingent path—for example, the planning component 112 may rely on an output of the nominal guidance system of the planning component 112 unless or until the output of the nominal guidance system would cause the vehicle 102 to stop or call teleoperations or fails to output a feasible, impact-free, and/or economical path or trajectory. In such an instance, the planning component 112 may switch to using the path output by the tree search 114. In additional or alternate examples, the planning component 112 may use the path output by the tree search 114 to generate a trajectory all the time, in certain regions (e.g., in areas with no lane references), based at least in part on sensor data and/or perception data, or the like. In some examples, the tree search 114 may execute the tree search discussed herein, which may include managing generation of the action node(s) (e.g., by sending requests to an application programming interface (API) associated with the planning component 112 and receiving candidate action(s) in response), and/or managing generation of the prediction nodes (e.g., by sending requests to an API associated with a prediction component of the perception component 110 and receiving current and/or predicted environment state data), etc.

The tree search 114 may comprise one or more GPUs or may be communicatively coupled with one or more GPUs (e.g., via a publish-subscribe messaging system, via a data bus—such as a Scalable Link Interface, etc.) and the techniques discussed herein may be parallelized and disseminated to threads of the GPUs, although it is contemplated that the techniques discussed herein may comprise at least portions that are serial, operated on CPUs, ASICs, FPGAs, or any other processor.

Example System

Figure 2:
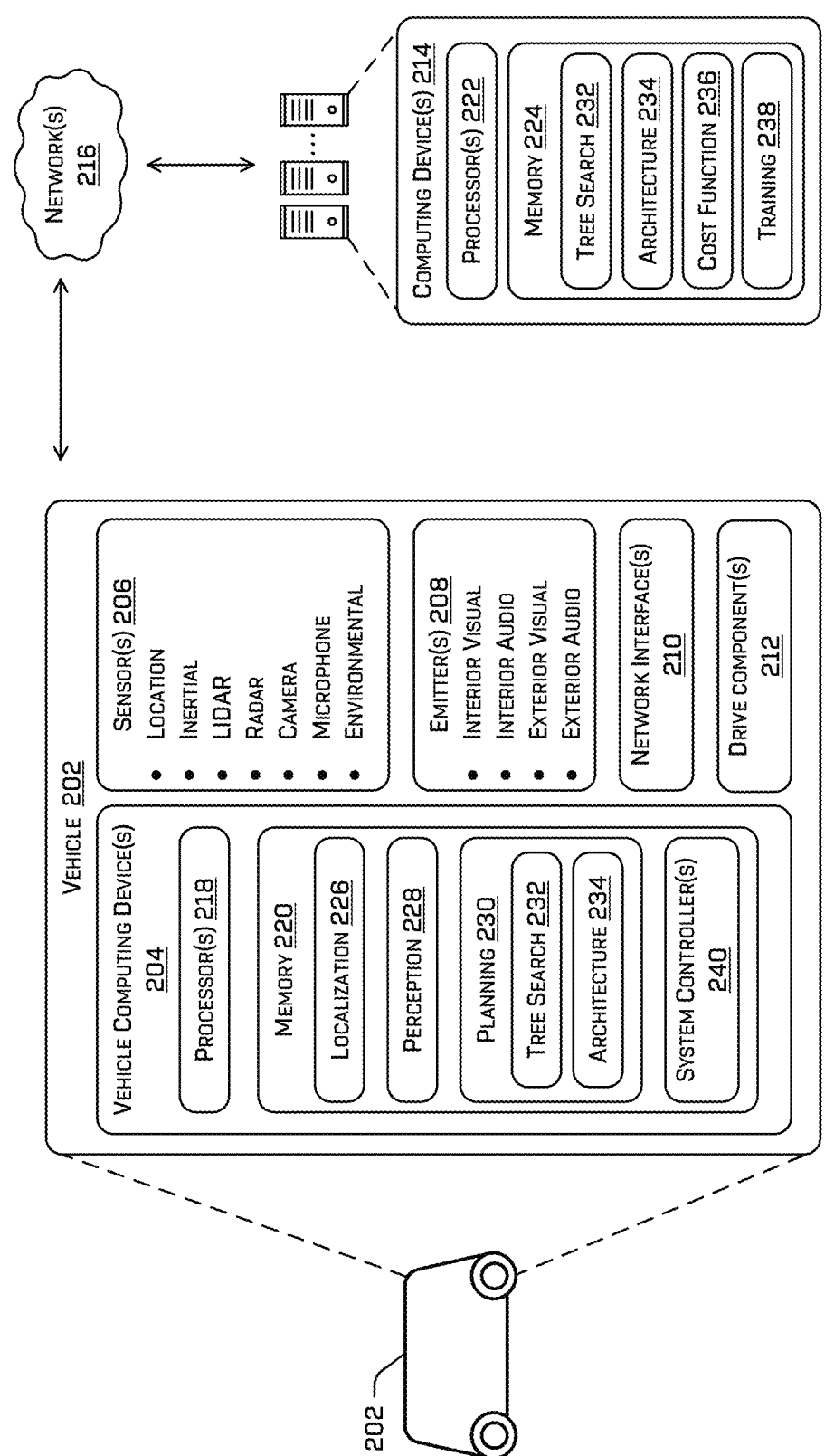
FIG. 2 illustrates a block diagram of an example autonomous vehicle architecture comprising a guidance system for unstructured path planning that includes a cost estimate architecture.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214. The position associated with a simulated sensor, as discussed herein, may correspond with a position and/or point of origination of a field of view of a sensor (e.g., a focal point) relative the vehicle 202 and/or a direction of motion of the vehicle 202.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface(s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 802.11 standards, short range wireless frequencies such as ultra-high frequency (UHF) (e.g., Bluetooth®, satellite), cellular communication (e.g., 3G, 4G, 4G LTE, 5G, etc.), or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more units (CPUs), graphics processing units (GPUs), tensor processing units (TPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, the memory 220 and/or memory 224 may store map data (undepicted in FIG. 2). In some examples, the map data may comprise a two-dimensional or three-dimensional representation of the environment, characteristic(s) associated therewith, and/or embedding(s). A two-dimensional representation may include, for example, a top-down representation of the environment and a three-dimensional representation may comprise position, orientation, and/or geometric data (e.g., a polygon representation, a digital wire mesh representation). Either representation may comprise a label associated with a portion of the top-down representation indicating different characteristic(s) and/or feature(s) of the environment, such as the existence and/or classification of a static object (e.g., signage, mailboxes, plants, poles, buildings, and/or the like); areas of the environment relevant to the vehicle's operations (e.g., crosswalks, drivable surfaces/roadways, turning lanes, controlled intersections, uncontrolled intersections, sidewalks, passenger pickup/drop-off zones, and/or the like); a rule of the road associated with a portion of the map data; conditional lighting data depending on the time of day/year and/or the existence and location of light sources; object characteristics (e.g., material, refraction coefficient, opacity, friction coefficient, elasticity, malleability); occlusion data indicating portion(s) of the environment that are occluded to one or more sensors of the vehicle 202; and/or the like. The occlusion data may further indicate occlusions to different classes of sensors, such as portion(s) of the environment occluded to visible light cameras but not to radar or lidar, for example. The two-dimensional representation and/or three-dimensional representation may have embeddings associated therewith that encode this data via the learned process discussed herein. For example, for a three-dimensional representation of the environment comprising a mesh, an embedding may be associated with a vertex of the mesh that encodes data associated with a face that may be generated based on one or more vertices associated with the face. For a two-dimensional representation of the environment an edge or other portion of the top-down representation may be associated with an embedding.

In some instances, the memory 220 and/or memory 224 may store a localization component 226, perception component 228, planning component 230, tree search 232, (cost estimation) architecture 234, cost function 236, training component 238, and/or system controller(s) 240—zero or more portions of any of which may be hardware, such as GPU(s), CPU(s), TPU(s) and/or other processing units. Perception component 228 may represent perception component 110, planning component 230 may represent planning component 112, tree search 232 may represent tree search 114, and system controller(s) 240 may represent controller(s) 116.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) of an environment, such as map data, and can continuously determine a location, velocity, and/or orientation of the autonomous vehicle within the map(s). In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, PIU data, GPS data, wheel encoder data, and the like to accurately determine a location, pose, and/or velocity of the autonomous vehicle. In some examples, the localization component 226 may determine localization and/or mapping data comprising a pose graph (e.g., a sequence of position(s) and/or orientation(s) (i.e., pose(s)) of the vehicle 202 in space and/or time, factors identifying attributes of the relations therebetween, and/or trajectories of the vehicle for accomplishing those pose(s)), pose data, environment map including a detected static object and/or its distance from a pose of the vehicle 202, and/or the like In some instances, the localization component 226 may provide data to various components of the vehicle 202 to determine an initial position of an autonomous vehicle for generating a trajectory and/or for generating map data. In some examples, localization component 226 may provide, to the perception component 228, prediction component, and/or architecture 234 a location and/or orientation of the vehicle 202 relative to the environment and/or sensor data associated therewith. For example, the output of the localization component 226 may be used as part of determining an initial vehicle state associated with the vehicle 202 that may be used by the architecture 234 as part of the techniques discussed herein. Additionally or alternatively the output of the localization component 226 may be used by the perception component 228 to determine a pose of another object relative to the vehicle 202 and/or the environment. This may additionally or alternatively be used as part of the techniques discussed herein to initialize a state of an object in the tree search.

In some instances, perception component 228 may comprise a primary perception system and/or a prediction system implemented in hardware and/or software. For example, the prediction component may be a simulation component although, in an additional or alternate example, the prediction component and the simulation component may be separate components the prediction component may be a computationally lighter simulation component that executes on the vehicle whereas the simulation component may be a more computationally intensive simulation component that executes on computing device(s) 214. For example, the prediction component might use a top-down representation of the environment, whereas the simulation component might use a three-dimensional representation of the environment. Regardless, the perception component 228 (and the prediction component thereof and/or simulation component) may work in concert with the tree search 232 to determine the environment state discussed herein. The perception component 228 may detect object(s) in in an environment surrounding the vehicle 202 (e.g., identify that an object exists), classify the object(s) (e.g., determine an object classification associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. The perception component 228 may include a prediction component that predicts actions/states of dynamic components of the environment, such as moving objects. In some examples, the perception component 228 may include the simulation component as part of the prediction portion of the perception component 228. Data determined by the perception component 228 is referred to as perception data.

A prediction component of the planning component 230 may predict a future state of an object in the environment surrounding the vehicle 202. In some examples, the future (predicted) state may indicate a future position, orientation, velocity, acceleration, and or other state (e.g., door state, turning state) of the object. The predicted state may comprise a series of such states or a single such state. In some examples, the prediction component may use an object detection and/or object track (or candidate object detection and/or virtual object track) to determine a predicted trajectory associated with the object or virtual object. In some examples, the predicted state of an object may be based on a candidate trajectory for controlling the vehicle 202. For example, the prediction component may predict whether or how the object will react to a candidate trajectory for controlling the vehicle 202. This data may be used as part of the tree search to determine a prediction node. Data determined by the prediction component is referred to as prediction data. In some examples, the prediction component may determine a top-down representation of a predicted future state of the environment. For example, the top-down representation may include an image with additional data embedded therein, such as where various channel pixel values encode the prediction data discussed herein.

The planning component 230 may receive a location and/or orientation of the vehicle 202 from the localization component 226 and/or perception data from the perception component 228 and may determine instructions for controlling operation of the vehicle 202 based at least in part on any of this data. In some examples, the memory 220 may further store map data, which is undepicted, and this map data may be retrieved by the planning component 230 as part of generating the environment state data discussed herein. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic, such as may be generated by system controller(s) of the drive component(s) 212)) that the drive component(s) 212 may parse/cause to be carried out, second instructions for the emitter(s) 208 may be formatted according to a second format associated therewith). In some examples, where the planning component 230 may comprise hardware/software-in-a-loop in a simulation (e.g., for testing and/or training the planning component 230), the planning component 230 may generate instructions which may be used to control a simulated vehicle. These instructions may additionally or alternatively be used to control motion of a real-world version of the vehicle 202, e.g., in instances where the vehicle 202 runs the simulation runs on vehicle during operation.

The planning component 230 may determine control instructions for the vehicle 202. In some examples, the tree search 232 may be part of the planning component 230. In some examples, the raw output of the tree search 232 may be a series of control states (e.g., position and/or heading of the vehicle, steering angle, and/or velocity) that may be used to generate the trajectory, i.e., the commands that the drive component(s) 212 may use to actuate the drive system of the vehicle 202.

In some examples, the tree search 232 may comprise a search algorithm such as, for example D*, D*lite, Focused Dynamic A*, A*, LPA*, Dijkstra's algorithm, and/or the like, although other search algorithms for searching and/or generating a directed graph and/or a weighted directed graph may be used. Additionally or alternatively, the tree search 232 may determine a directed graph, sparse partially observable tree (DESPOT) determined according to a partially observable Markov decision process (POMDP). The tree search 232 may manage determining the action node(s) and/or prediction node(s) of the tree search by transmitting a request for the planning component to generate candidate action(s) based at least in part on an environment state determined in association with a prediction node and/or one or more heuristic candidate action(s) may be used, such as various patterns of braking, accelerating, and/or steering (e.g., maintaining a current velocity and steering angle, staying in a lane, executing various typical turns or other maneuvers). The candidate action(s) may be generated to reach one or more future states from the state indicated by the prediction node. The tree search 232 may receive map data and an initial state of the environment from the perception component 228 (i.e., in association with a root node of the tree search), which may include static object detections to be aggregated with the map data to create environment state data, which may indicate static object data (e.g., map data, static object(s) with dynamic components such as light state), general environment state data (e.g., weather state, lighting state, temperature), dynamic object data, self-reflexive vehicle 202 data (e.g., received from the localization component 226), and/or track(s) associated with the vehicle 202 and/or one or more detected dynamic object(s).

In some examples, the tree search 232 may transmit this a state indicated by a prediction node or the initial environment state indicated by the root node to the planning component 230 and may receive one or more candidate actions from the planning component 230. A candidate action may be associated with a future state that may be realized by implementing that candidate action, but it's computationally expensive to expansively search the tree, e.g., by determining all possible combinations of candidate actions and/or their respective resultant predicted future states. The computation requirements would exponentially increase and determining the optimal action would require expanding the tree search to an infinite horizon. Moreover, to reach true convergence, the tree search may need to be infinitely searched, which is impossible. Additionally, simulating the behavior of other objects to determine exactly what the future state of the environment would be if a particular candidate action were implemented by the vehicle and to continue to generate candidate actions for every future state that is generated may also be computationally intensive. Accordingly, the technique discussed herein may be used to determine a cost estimate associated with a future state to determine which future state to explore by generating candidate actions for just that future state, at least until it is determined that subsequent candidate actions determined based on that future state are prohibitively costly.

For examples that use the cost function 236 to determine the cost discussed herein, the tree search 232 may transmit at least one of these one or more candidate actions to the simulation component and/or a prediction component of the perception component 228, which may determine a predicted state of the environment that is based at least in part on the candidate action. In examples where the architecture 234 is used to determine an estimated cost, the architecture 234 uses the environment state data, dynamic object data, and/or trace (s) associated with a state of the tree to generate the estimated cost according to the techniques discussed herein.

This process may be iterated until a time horizon, distance, progress along a route, target position, and/or suitable path is reached/determined. For example, the time horizon may be a length of time into the future from a current time (e.g., 500 milliseconds, 1 second, 2, seconds, 5 seconds, 8 seconds, 10 seconds). This length of time may be broken into m units of time (time steps), where m is a positive integer, from a current time up to the time horizon. Each time step may include a layer of prediction nodes that are all associated with that time step and candidate actions that would be required to reach those future states. For prediction nodes that aren't explored these future states may merely indicate a future state of the vehicle 202 since that may be known with minimal computation. In an additional or alternate example, the future state indicated by unexplored prediction nodes may comprise the future state of the vehicle achieved by a corresponding candidate action and a kinematics-based prediction of dynamic object position(s). This kinematics-based approach may use a computationally-light kinematics-based prediction of movement of a dynamic object that doesn't take into account the candidate action. Whereas an explored prediction node (i.e., a prediction node selected according to the techniques discussed herein as having a cost estimate that is the minimum of the cost estimates for the prediction nodes of the same layer or a cost estimate below a threshold cost) may indicate a future state that is determined by the prediction component. That future state may be determined based at least in part on a Kalman filter and/or machine-learned model that predicts a future state of the vehicle and/or any dynamic objects in the environment based on the candidate action. In other words, this prediction may further include a prediction of an object reaction to the candidate action and other relevant signals in the environment, such as weather state, signage state, blind corners, and/or the like, all of which may be accounted for in the environment state data used by the prediction component to determine such a future state.

In additional or alternate examples, the tree search may terminate upon reaching a distance. The distance may define a total distance covered by the constituent actions that make up a path, whereas progress along a route may be the displacement along/with reference to a route. In an additional or alternate example, a target position may be used to terminate the tree search. For example, upon determining a path that reaches the target position in the environment, the tree search may output that path and terminate. In an additional or alternate example where the tree search is used when a nominal planning component failed to create a valid trajectory or path, the tree search may terminate upon determining a valid path (e.g., a path that is impact-free and conforms to a rule set, which may specify comfort metrics, conformance to laws, etc.). In additional examples, iterations may continue until an objective is achieved (e.g., a successful lane change, a successful merge, or any other completed action). In any one or more examples, any combination of the above may further be used as decision points for branching the tree.

The architecture 234 may operate on the vehicle 202 and/or on the computing device(s) 214. In some examples, the architecture 234 may execute on computing device(s) 214 during training or re-training of the architecture 234 (when the cost function 236 has been modified) and may operate on the vehicle 202 at inference and/or for re-training when a modified cost function is transmitted to the vehicle 202 from the computing device(s) 214. The architecture 234 may determine an estimated cost associated with a prediction node of the search tree, which identifies an estimated minimum cost or average cost of the candidate actions to arrive at that prediction node and/or to travel from that prediction node. In some examples, the architecture 234 may comprise a machine-learned model according to the discussion in U.S. patent application Ser. No. 18/084,419, filed Dec. 19, 2022, the entirety of which is incorporated by reference herein for all purposes.

The architecture 234 may receive environment state data (which may comprise a data structure fusing map data and current environment state data determined by the perception component 228, such as static object detection(s) and/or traffic light, vehicle indicator, or other signal states), track(s) of the vehicle 202 and one or more dynamic object(s) detected as being in the environment (e.g., indicating a current and historical (when available) state of the vehicle or object, such as the position, orientation, velocity, classification, and/or the like over time up to a current time), and predicted states of dynamic objects, signals (e.g., physical indicators, such as traffic lights, vehicle turn indicators, railroad crossing indicators, and the like), and/or the vehicle 202 up to a target prediction node that is the subject of the cost estimate. The architecture 234 may use this data, as described herein, to determine a cost estimate associated with a target prediction node.

Note that, although the discussion herein includes determining a single cost estimate for a prediction node, this may be a simplification for the sake of comprehension. In practice, the output of the architecture 234 may comprise a set of estimated costs, each of which is associated with a different prediction node of a tree search, such as the prediction nodes of a furthest layer (e.g., latest time step) explored by the tree search up to that point. Also, the prediction nodes may be associated with multiple (as-of-yet undetermined) candidate actions that may stem therefrom, so the estimated cost may be considered a rough estimate of the average costs of or minimum cost among those different candidate actions, depending on how the architecture 234 is trained.

During inference, the architecture 234 may be used to determine a prediction node to explore based at least in part on determining that the prediction node is associated with a lowest estimated cost from among multiple prediction nodes and their respective estimated costs. In some examples, the tree search 232 may use the cost function 236 to determine costs associated with candidate actions associated with that prediction node to verify that the prediction node is a good candidate for exploration. Note that "exploring" a prediction node means using that prediction node as the target future vehicle 202 state (e.g., a future position, heading, steering angle, steering rate, velocity, and/or the like) for candidate actions to arrive at or for determining candidate actions to start from the future vehicle state indicated by that prediction node. In additional or alternate examples, the prediction node determined for exploration may be determined based at least in part on determining that the estimated cost associated with the prediction node is less than a threshold estimated cost or that the estimated cost is lower than n number of estimated costs associated with different prediction nodes, where n is a positive integer that may be 80%, 90%, 95%, 98%, 99%, or some other percentage of the total number of prediction nodes for which estimated costs where determined.

In some examples, determining the cost using the cost function (as a result of determining a prediction node to explore based on its estimated cost generated by the architecture 234) may comprise simulating future states of dynamic object(s) in the environment. Although in additional or alternate examples, determining the cost for the prediction node or a candidate action node stemming therefrom may be determined by summing a transition cost associated with the candidate action with a total of the costs incurred by taking a default action at each time step after the candidate action up to the termination point. The default action may include, for example, repeating the first candidate action, maintaining an action indicated by the first candidate action (e.g., continue turning, continue braking), maintaining operation in a same lane associated with a future state that would be achieved by the first candidate action, and/or the like. In some examples, determining the future state of a dynamic object may be based at least in part on classifying the dynamic object as reactive or passive, as discussed in more detail in U.S. Patent Pub. No. 2023/0041975, filed Aug. 4, 2021, the entirety of which is incorporated herein. For example, a simulation component may comprise an agent filter that may comprise a machine-learned model trained to classify dynamic objects detected by the perception component 228 as being reactive or passive. In at least one example, the classification need not be binary and may be a score, such as a number between 0 and 1, where 0 indicates that an object is passive and a 1 indicates that an object is reactive. In some examples, the agent filter may receive a track associated with a dynamic object and a candidate action of the vehicle as input and may determine whether the dynamic object is passive or reactive according to a binary classification or a regression, as discussed above. A purely passive agent will not change its behavior at all based on the behavior of the vehicle 202/the candidate action, whereas an action taken by a reactive object is likely to be affected by action(s) of the vehicle 202, at least to some extent. In an additional or alternate example, the agent filter may determine a likelihood (e.g., a covariance, a posterior probability) that a dynamic object will modify an action associated therewith based on an action of the vehicle 202. Dynamic objects associated with a likelihood meeting or exceeding a threshold likelihood may be classified as being reactive, whereas another dynamic object associated with a likelihood that doesn't meet the threshold may be classified as a passive object.

During training, instead of reserving use of the cost function 236 for a prediction node that is determined for exploration, the cost function 236 may be used on every prediction node since real-time operation is not necessary and to determine the actual lowest cost prediction node. This allows the system to self-generate ground truth data by the cost function 236. Moreover, any adjustments to the cost function 236 may allow these changes to be reflected in the ground truth data used for training the architecture 234, thereby automatically updating the architecture 234 to reflect any changes in the cost function 236.

For example, if the cost function 236 has been modified at computing device(s) 214, the architecture 234 may be retrained by re-determining the costs associated with the prediction nodes by the updated cost function, and the updated cost function and re-trained architecture may be transmitted from computing device(s) 214 to vehicle 202 to replace the architecture 234 and cost function 236.

In some examples, a two or three-dimensional representation of the scenario indicated by the environment state data, dynamic object data, and predicted state data may be generated by a simulation component (or prediction component of the perception component 228) as simulation data. The simulation data may be used to instantiate and execute a simulation. During the simulation, a candidate action may be used to control motion of a simulation of the vehicle 202 during execution of the simulation. A two-dimensional representation may include, for example, a top-down representation of the environment and the detected object(s) and a three-dimensional representation may comprise position, orientation, geometric data (e.g., a polygon representation, a digital wire mesh representation), material, lighting, and/or lighting data. Both representations may comprise movement data associated with one or more objects of the environment and/or may include occlusion data indicating portion(s) of the environment that are occluded to one or more sensors of the vehicle 202. This occlusion data may further indicate occlusions to different classes of sensors, such as portion(s) of the environment occluded to visible light cameras but not to radar or lidar, for example. In additional or alternate examples, the simulation component may comprise a computational construct (e.g., an algorithmic and/or mathematical representation used by a computing device in performing the operations described that is not intended to be (and/or incapable of being) visualized).

The scenario data may comprise a two-dimensional representation of an environment associated with a scenario, objects contained therein, and characteristics associated therewith, all of which may be part of a scenario associated with the log data. For example, the scenario data may identify a position of an object, an area occupied by the object, a velocity and/or acceleration associated with the object, whether the object is static or dynamic, an object type associated with the object (e.g., a classification such as "pedestrian," "bicyclist," "vehicle," "oversized vehicle," "traffic light," "traffic signage," "building," "roadway," "crosswalk," "sidewalk"), and/or other kinematic qualities associated with the object and/or the object type (e.g., a friction coefficient, an elasticity, a malleability). As regards the environment itself, the scenario data may identify a topology of the environment, weather conditions associated with the environment, a lighting state (e.g., sunny, cloudy, night), a location of light sources, and/or the like. In some examples, topology, fixed object (e.g., buildings, trees, signage) locations and dimensions, and/or the like associated with the scenario data may be generated based at least in part on map(s). In some examples, the scenario data may be used (e.g., by the simulation component) to instantiate a two- or three-dimensional representation of the object and/or the simulated environment may be instantiated based at least in part on map data (e.g., which may define a topology of the environment; the location and/or dimensions of fixtures such as signage, plants, and/or buildings) and/or the scenario data.

Additionally or alternatively, the simulation may include a simulated object that is controlled by an agent behavior model as discussed in more detail in U.S. Patent Pub. No. 2021/0370972, filed Jun. 1, 2020, the entirety of which is incorporated by reference herein, in addition to or instead of a nominal prediction component of the simulation component or a prediction component of the perception component 110. The agent behavior model may control simulated motion of a simulated representation of a dynamic object, such as a reactive dynamic object. In some examples, the simulation may be executed as part of a forecasting/prediction operation, so one or more simulations may be executed to determine a prospective scenario (e.g., predicted environment state data) based on a candidate action generated according to the tree search discussed herein.

In some examples, a simulated sensor may determine simulated sensor data based at least in part on a simulation executed by the simulation component. For example, U.S. patent application Ser. No. 16/581,632, filed Sep. 24, 2019, the entirety of which is incorporated by reference herein, discusses this in more detail. In an additional or alternate example, the simulation executed by the simulation component may itself comprise simulated sensor data. The perception component 228 (e.g., a copy thereof, which may comprise software and/or hardware, which may include hardware-in-the loop simulation) may receive such sensor data and/or simulated sensor data may output perception data that is provided as input to the planning component 230. The planning component may use the perception data to determine instructions for controlling motion of the vehicle 202, which may be used to control at least the simulated representation of the vehicle 202 in the simulation and, in some examples, may be additionally used to control real-world motion of the vehicle 202, such as in examples wherein the simulation component executes on-vehicle during real-world operation.

In some examples, the training component 238 may comprise the loss function discussed herein and may determine a loss as discussed herein. In some examples, the loss may be a mean squared error, cross-entropy, Wasserstein, or other loss. Regardless, once the loss is determined based at least in part on the techniques discussed herein, the training component 238 may alter one or more parameters of the architecture 234 to reduce the loss (e.g., via gradient descent). For example, if the architecture 234 were to redetermine the estimated cost again after the architecture 234 has been modified to reduce the loss, the updated estimated cost determined by the updated architecture 234 may result in a lower loss as determined according to the techniques discussed herein.

The memory 220 and/or 224 may additionally or alternatively store a mapping system, a planning system, a ride management system, simulation/prediction component, etc.

As described herein, the localization component 226, the perception component 228, the planning component 230, architecture 234, cost function 236, and/or other components of the system 200 may comprise one or more ML models. For example, localization component 226, the perception component 228, the planning component 230, architecture 234, and/or cost function 236 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Any type of machine-learning can be used consistent with this disclosure. For example, machine-learning models can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, Xception, ConvNeXt, U-net, EfficientDet, and the like; visual transformer(s) (ViT(s)), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), SwinV2-Base, CLIP ViT-Base, SwinV2-Tiny, DINO ViT-Small, or the like; and/or general or natural language processing transformers, such as BERT, GPT, GPT-2, GPT-3, or the like. In some examples, the ML model discussed herein may comprise PointPillars, SECOND, top-down feature layers (e.g., see U.S. Pat. No. 10,649,459, filed Apr. 26, 2018, which is incorporated by reference in its entirety herein for all purposes), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 240 (which may be a portion of the drive component(s)), which may be configured to control steering, propulsion, braking, safety, emitters, communication, and other systems of the vehicle 202. These system controller(s) may communicate with and/or control corresponding systems of the drive component(s) 212 and/or other components of the vehicle 202. For example, the planning component 230 may generate instructions based at least in part on perception data generated by the perception component 228 and/or simulated perception data and transmit the instructions to the system controller(s), which may control operation of the vehicle 202 based at least in part on the instructions. For example, the system controller(s) 240 may be configured to actuate a steering rack and/or propulsion mechanism sufficient to track a trajectory and/or path output by the tree search 232 and/or planning component 230.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Path Generation Using a Tree Search and Cost Estimation Architecture

Figure 3A:
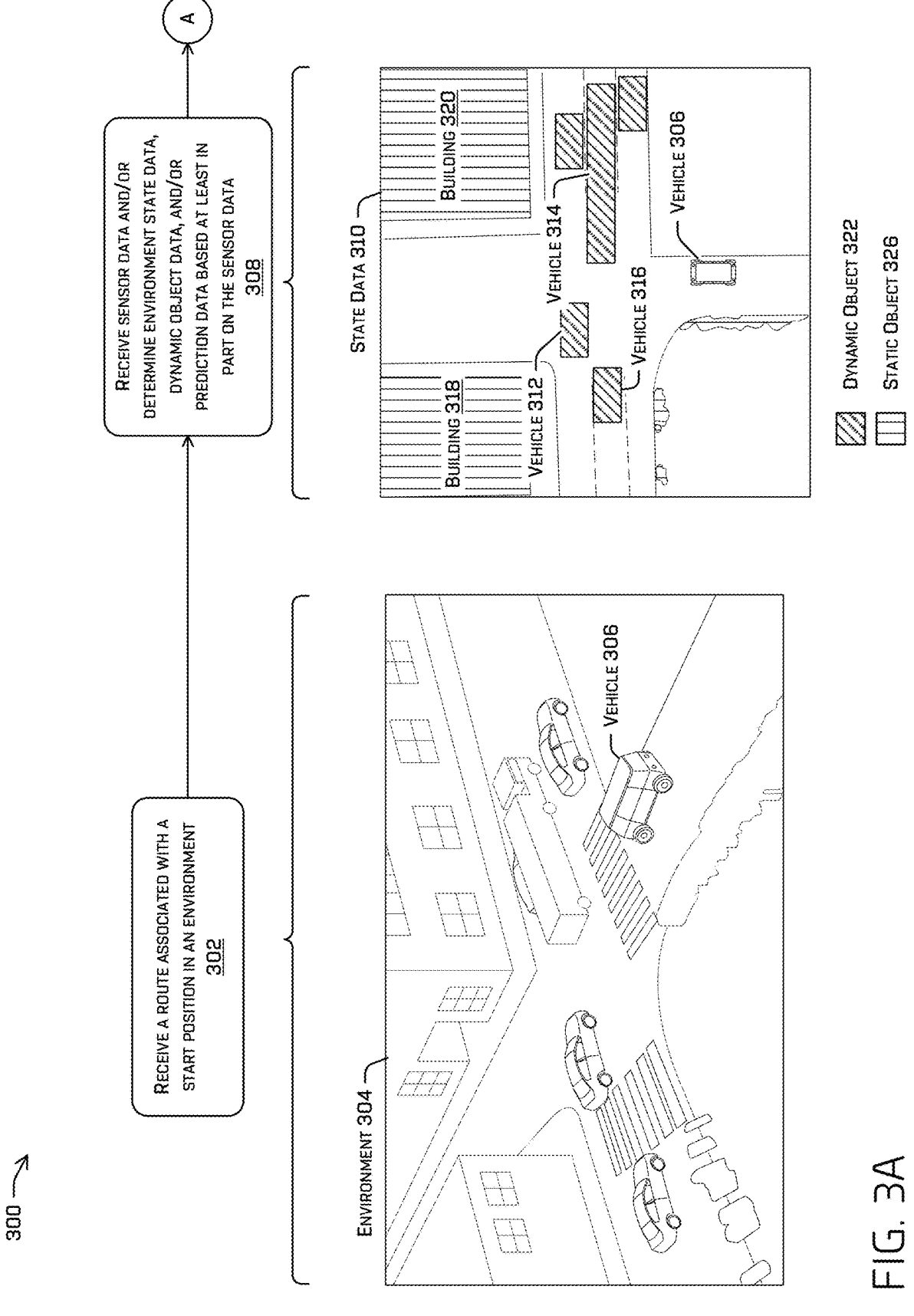
Figure 3B:
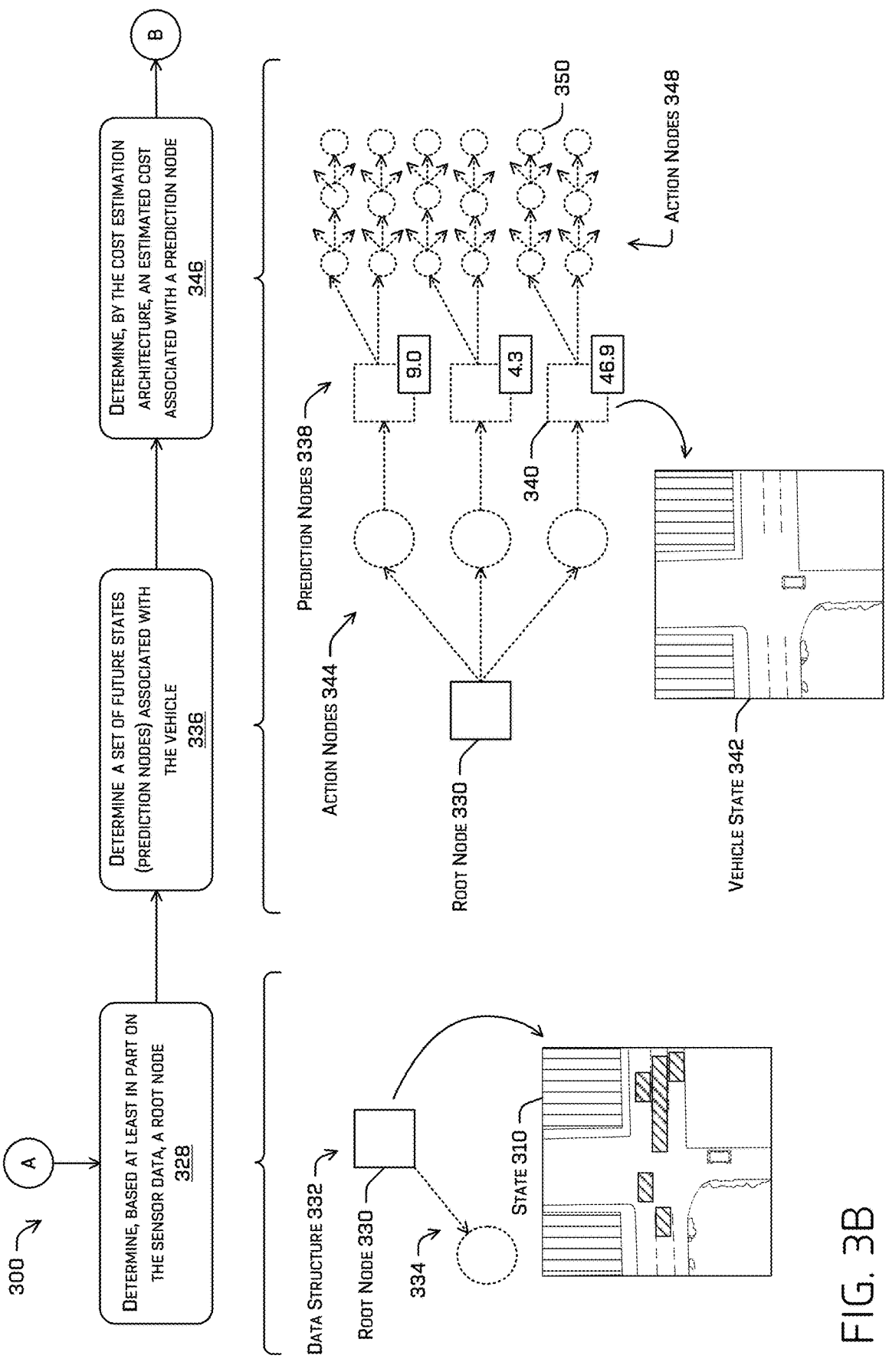

FIGS. 3A-3C illustrate a pictorial flow diagram of an example process 300 for generating a path for controlling a vehicle (e.g., vehicle 202) using a tree search that employs an estimated cost architecture, which may be determined based at least in part on sensor data, perception data determined from the sensor data, and/or map data. In some examples, example process 300 may be executed by a planning component (e.g., planning component 23) of the autonomous vehicle although, in at least some examples, example process 300 may be additionally or alternatively executed by a simulation component, perception component, and/or prediction component of the autonomous vehicle. In the latter example, the planning component may coordinate operations of the various components, such as by transmitting API requests to APIs associated with each of the components and using the API responses to execute the tree search 232 discussed herein. In another example, the planning component may coordinate the operations of the component(s) using messages transmitted over a publish-subscribe network to/from the various components. In some examples, the tree search may include executing a Monte-Carlo tree search (MCTS); partially observable Monte-Carlo planning (POMCP); Markov decision process (MDP), such as a partially observable MDP (POMDP); or the like improved with the techniques discussed herein, including the estimated cost(s) determined by the cost estimation architecture.

At operation 302, example process 300 may comprise receiving a route associated with at least a start position in an environment, according to any of the techniques discussed herein. FIG. 3A depicts an environment 304 in which a vehicle 306 is located that is executing example process 300. Vehicle 306 may represent vehicle 202. The start position may be associated with a current position of the vehicle 306 and the route may specify an end position and may, in some examples, include intervening targets or operations, such as exiting a freeway, seeking to stay in a particular lane, targeting parking on a particular block (but not a particular position, although in some examples, a particular portion of the block may be identified), etc. In various examples, such a route may comprise a general geometric path from a current or start position to a destination or end position which may, in at least some examples, align with portions of a map. Such routes may be determined by one or more components on the vehicle and/or received from a remote computing device to determine an optimal series of connected segments (e.g., based on time to arrival, battery life, policies, etc.) accounting for various constraints.

At operation 308, example process 300 may comprise receiving sensor data from one or more sensors, according to any of the techniques discussed herein. The sensor(s) may be associated with the vehicle and/or another computing device. Operation 308 may additionally or alternatively comprise determining environment state data based at least in part on the sensor data. In some examples, the perception component may determine parts of state data 310. For example, the perception component may detect static and/or dynamic objects in the environment based at least in part on sensor data. The state data 310 may be associated with a most recently received set of sensor data (e.g., a current time, although there may be a small delay between receiving the sensor data and determining the perception data). In some examples, the environment state data may comprise such state data and may additionally or alternatively comprise map data and/or previous state data back to a historical time horizon.

To further illustrate, the perception component may determine dynamic state data which may comprise a position, orientation, and/or characteristics of the vehicle 306 in the environment, which may correspond to real-time operation of an autonomous vehicle. The dynamic state data 310 may additionally or alternatively comprise an indication of an object type associated with one or more objects (e.g., passenger vehicle 312, oversized vehicle 314, passenger vehicle 316) and/or characteristics associated with the one or more objects (e.g., a position, velocity, acceleration, heading, material type, kinematic coefficient). Additionally or alternatively, the perception component may determine static object data that augments map data retrieved from a memory to form environment state data. In the depicted example, this may include building 318, building 320, and the objects detected as being static, indicated with vertical hashes (static object(s) 326). Objects classified as being dynamic (moving or capable of movement) are indicated using diagonal hashes (dynamic objects 322). Note that the state data 310 is represented as a two-dimensional image, although, in additional or alternate examples, the state data 310 may comprise a data structure, such as a pub-sub message, a three-dimensional representation, a top-down representation as indicated in a multi-channel image, and/or the like. In at least one example, the environment state data may be indicated in a multi-channel image as a top-down down representation.

The top-down representation may comprise a data structure, such as a multi-channel image, where different channels of the image identify the existence, absence, or quality of a characteristic of the environment, as determined by the perception component based at least in part on sensor data received by the vehicle. For example, a portion of the top-down representation, such as a pixel, may indicate, depending on the channel of the image, object detection data (e.g., the presence of an object at a location in the environment associated with that portion, an object classification of the object (e.g., one channel may indicate that presence or absence of a cyclist or a portion of a cyclist at a particular location in the environment), object heading, object velocity and/or acceleration, and/or other state (e.g., door state, turning state, intent state such as signaling turn)), map data (e.g., existence of a sidewalk, existence of and/or direction of travel associated with a roadway, signage location(s) and/or states, static object locations and/or classifications), and/or the like. Determining a top-down representation is discussed in more detail in U.S. Pat. No. 10,649,459, issued May 12, 2020, which is incorporated in its entirety herein for all purposes, and/or a top-down prediction associated with the environment, as described in more detail in U.S. patent application Ser. No. 16/779,576, filed Jan. 31, 2020, which is incorporated in its entirety herein for all purposes. Additionally or alternatively, the top-down representation may indicate such data from a current time, t, to a time in the past, n, such that that top-down representation comprises multiple top-down representations from t to t-n.

In some examples, the state data 310 may further comprise a prediction of whether an occluded object exists, as discussed in more detail in U.S. patent application Ser. No. 16/407,139, filed May 8, 2019, the entirety of which is incorporated by reference herein, or similar thereto. In an additional or alternate example, the prediction of whether an occluded object exists may be determined by a machine-learned model that receives the environment state data as input and outputs a field of likelihoods. Any region of the environment associated with a likelihood that meets or exceeds a threshold may be output as a potential false negative, which may be used as part of the candidate action generation.

The state data may comprise an object classified by the perception component as being dynamic. For example, a dynamic object, which may also be referred to herein as an agent, may comprise a vehicle, a bicyclist, pedestrian, a ball, a wind-blown plastic bag, and/or any other moveable object or object that is likely to move within a time period. An object such as a bench or table may be moveable but, in a time period relevant to operation of the vehicle, is unlikely to move and may be considered a static object. The state data 310 may include dynamic object(s) and may include a dynamic object classification and/or likelihood determined by the agent filter in association with a dynamic object. For example, the classification may include whether a dynamic object is passive or reactive and/or a likelihood thereof.

Turning to FIG. 3B, at operation 328, example process 300 may comprise determining, based at least in part on the sensor data and/or state data 310, a root node 330 of the tree search, according to any of the techniques discussed herein. For example, the root node 330 may indicate a current state of the vehicle that may comprise localization data determined by a SLAM algorithm based at least in part on sensor data, velocity determined from wheel speed encoders, steering angle determined based at least in part on sensor(s) in the steering rack, and/or the like. In some examples, determining the root node may comprise determining a data structure 332 for the tree search, which may comprise setting up and storing a directed acyclical graph (DAG); upper confidence bounds applied to trees (UCT); determinized sparse partially observable tree (DESPOT); or the like for modeling control states and environment states. The root node may be associated with a current time and/or the most recent sensor data or batch of sensor data. As such, the root node may be associated with perception data that may or may not include prediction node data. In other words, the root node may identify environment state data that includes a current position, orientation, velocity, acceleration, classification, etc. of static and/or dynamic objects (including similar information for the vehicle, which may be generated by the localization component of the vehicle) in the environment and may additionally or alternatively include historical data of the same. According to the discussion herein the root node may function as a prediction node even though the state it indicates is current state data rather than future state data. The root node may accordingly be an exception whereas other prediction nodes indicate a future state associated with a time step beyond the current time.

Predictions of how the object(s) will behave in the future, correspondingly how this data will change in the future, and the vehicle state that may result from a candidate action may be associated with the prediction node(s) discussed herein and, in some examples, the prediction node data for a current time step may be associated with the root node. In other words, the root node may include the current state of the environment, including the object(s) therein, localization data related to the vehicle (e.g., determined by SLAM), and/or prediction node data identifying one or more possible future states of the environment, which may include a position, orientation, velocity, acceleration, classification, etc. of an object associated with a future time.

The figures depict prediction nodes (and the root node 330, which may be a prediction node) as squares, and action nodes as circles. A prediction node may encode a future belief state (e.g., a determination of how the environment is likely exist at a given state given the previous set of actions and states) and/or prediction node data indicating how that future state would be reached, which may include an indication of one or more candidate actions it would take to reach that future state. The dashed line and circle 334 represent the relationship between the root node 330 and an as-of-yet undiscovered/undetermined action node that is based on the root node 330. In an additional or alternate example, the candidate actions may be known but a future state may not be known beyond the future vehicle state that would result from implementing a candidate action (e.g., such as dynamic object motion based on simple kinematics and/or reactive responses of the dynamic object(s) to the candidate action). The root node 330 may identify the state data 310 and one or more predicted environment scenarios associated with a current time. For simplicity only the current state data is displayed in FIGS. 3A-3C for the sake of space, although predicted state data may additionally be associated with the root node 330.

At operation 336, example process 300 may comprise determining a set of future states associated with the vehicle. In some examples, a set of future states may be generated for the prediction node that is being explored, which in the depicted example is only the root node so far. In further iterations, the set of future states may be based at least in part on a prediction node that was determined according to operation 352. This set of candidate future states may be indicated as prediction nodes 338 (depicted as squares) as part of the tree search, and may be determined by sampling a state space that is constrained based at least in part on the vehicle state indicated by prediction node upon which the set of future states is based (as indicated by the dashed arrows). For example, this may include sampling a space of kinematically achievable vehicle states according to braking, steering, and/or acceleration constraints of the vehicle and the vehicle's state indicated by the previous prediction node, which may include the position, heading, velocity, and/or steering angle of the vehicle at that state. For example, prediction node 340 may indicate the vehicle state 342 where the vehicle has progressed straight from the last position of the vehicle. The prediction nodes determined based at least in part on the current prediction node, i.e., root node 330 in this case although the prediction node may be a subsequent prediction node for subsequent iterations of the tree search, may be associated with a same time step along time steps from a current time to a time horizon that caps the tree search.

In an additional or alternate example, the future states (and corresponding prediction nodes) may be determined based at least in part on generating one or more candidate actions, each of which may be represented by an action node in the tree search and may terminate in a different future state indicated by a prediction node. For example, FIG. 3B depicts a set of prediction nodes 338 that have been determined based at least in part on respective candidate actions indicated by action nodes 344, depicted as circles (dashed circles because none of the prediction nodes have, as of yet, been selected for further exploration). A candidate action may comprise, in some examples, a control policy for the vehicle, which may include a series of positions for the vehicle to follow, associated with different times (which inherently, limits or creates a target velocity for the vehicle). The vehicle may use this control policy to determine a steering angle, steering rate, and/or velocity over time to accomplish this control policy. Additionally or alternatively, a candidate action may comprise a set of controls over time defining position, velocity, and steering angle to be achieved at particular time(s).

Regardless of how the prediction nodes 338 are generated, the prediction nodes 338 of a same layer may all be associated with a same time step or distance towards the termination point. For example, the prediction nodes 338 may be associated with a first future time after a future time indicated by the root node 330. This first future time may be one of a set of discrete future times from the current time associated with the root node 330 to a future time associated with the termination point.

At operation 346, example process 300 may comprise determining, by the cost estimation architecture (e.g., architecture 234), an estimated cost associated with a prediction node, such as prediction node 340. In some examples, the cost estimation architecture may determine a set of cost estimates where each cost estimate is associated with a different prediction node of the furthermost layer in the tree search, which in the illustrates case would include a cost estimate associated with each of prediction nodes 338. In an example where the tree search has determined that a prediction node previously selected for exploration results in a prohibitively costly series of actions, the cost estimation architecture may additionally or alternatively re-generate cost estimation(s) for prediction nodes of a previous layer to update the cost estimate(s) associated with those prediction nodes based at least in part on further data determined for the tree search. As discussed further herein, the cost estimation architecture may generate the cost estimation based at least in part on environment state data, dynamic object data, and/or prediction node data that indicates how the prediction node was reached in the tree search. See U.S. patent application Ser. No. 18/084,419, filed Dec. 19, 2022, the entirety of which is incorporated by reference herein for all purposes. For example, FIG. 3B depicts these estimated costs as numbers in boxes associated with each of the prediction nodes 338. A first estimated cost determined for a first prediction node is "9.0," a second estimated cost determined for a second prediction node is "4.3," and a third estimated cost determined for a first prediction node is "46.9." Note that although there are three prediction nodes in the depicted example, any number of prediction nodes could be created, and although the cost estimate is depicted as a positive decimal greater than 1, the costs may be normalized, such as in a logarithmic scale or normalized across the cost estimates.

The estimated cost of a target prediction node may indicate an estimate of the cost for the action(s) (and their resultant states) to reach the termination point of the tree search from the state indicated by the prediction node. In essence, the estimated cost for a target prediction cost may estimate/predict the upper bound cost to go for the prediction node. For example, FIG. 3B depicts some of the potential candidate actions as action nodes 348 that may follow each of the prediction nodes 338 up to a termination point (e.g., an end point, a horizon time, an m-th node, or the like). As discussed later, the cost function may be used to determine a cost associated with each candidate action based at least in part on several factors and to keep a running total of a trace from the prediction node to a final node associated with a termination point (e.g., by adding each cost of sequential candidate actions to the total), such as action node 350. For example, the total cost associated with a path to action node 350 would include a sum of each of the costs of the action nodes that intervene between the action node 350 and the prediction node 340. Once a path and total cost for each has been determined for multiple paths (series of action nodes) reaching the termination point, path that is associated with a lowest total cost, as determined by the cost function, may be determined. This minimum cost path is discussed in more detail below.

Note that, although FIG. 3B depicts just action nodes following the prediction nodes 338, it is understood that an action node may result in a new prediction node that indicates a resultant state of the vehicle/environment/dynamic objects, although, in some examples, these may be left out for the sake of determining the total cost associated with a path.

At operation 352, example process 300 may comprise determining, based at least in part on the estimated cost, candidate action(s) of a prediction node 354 to explore. Operation 352 may include determining that the estimated cost determined by the architecture 234 for the prediction node associated with the estimated cost, "4.3," was a minimum estimated cost from among the set of estimated costs determined by the cost estimation architecture for a most recent layer of prediction nodes, i.e., prediction nodes 354 in the depicted example. Moreover, operation 352 may comprise determining a set of candidate actions that would cause the vehicle to reach a termination point stemming from a future state indicated by the target prediction node 354. In the depicted example this would include determining a set of candidate actions that would cause the vehicle to transition from the state indicated by the prediction node 354 to a termination point (e.g., a termination event, a displacement along the route is achieved, a location is reached, a number of time steps has been reached (e.g., actions up to a time horizon have been determined), a predefined number of action nodes has been generated, a time limit for the computation has been reached, and/or a computation or storage limit has been reached). The data structure 332 may be updated as data structure 356 to add the prediction node 354 and action nodes each indicating a different one of the candidate actions in the set that are based at least in part on prediction node 354. FIG. 3C depicts these action nodes as action nodes 358, each of which may be associated with a different candidate action for achieving different future states reachable from the future state indicated by prediction node 354. For example, a path may comprise any action nodes up to prediction node and a series of action nodes up to a termination point. In the depicted example, this could include the solid action nodes leading up to action node 360, which may be an action node associated with a termination point, such as reaching a maximum displacement along the route as compared to the other action nodes.

In some examples, each candidate action in the series leading up to action node 360 may be associated with controlling the vehicle over different time periods (e.g., each candidate action comprises controls or a control policy for the vehicle to achieve over a time period). In some examples, the time periods associated with each subsequent layer of action nodes may be equal or, in an additional or alternate example, the time periods may increase in length (e.g., exponentially, logarithmically). For example, a first candidate action may be associated with controlling the vehicle over a 0.5 second period, a second candidate action associated with an action node one layer deeper than the first layer (e.g., action node) may control the vehicle over an additional 0.75 second period, a third candidate action in a third layer may control the vehicle over a period of 1 second, and so on. This increasing time period may ensure that a greater precision and/or accuracy is obtained for imminent actions, while also ensuring that the more distant actions won't control the vehicle in a manner that results in higher costs/negative outcomes.

At operation 362, example process 300 may comprise determining, by a cost function, a cost associated with one of the candidate actions. In some examples, this cost may be a sub-cost as part of determining a total cost 364 for a series of candidate actions that, together, form a path to a termination point. For example, the total cost 364 of the path comprising the solid action nodes may comprise sub-costs determined for each of the candidate actions indicated by the action nodes making up the path. In some examples, a total cost may be determined for each potential path, such as the other paths depicted in dotted lines. This total cost may be determined by the cost function and may be different than and/or not include the estimated cost determined by the architecture 234. Note that FIG. 3C also depicts other potential connections to other unillustrated action nodes as mere arrows and that the number of action nodes and resultant paths is limited by space. The number of candidate nodes and paths may be greater or lesser than what is depicted and the number of layers of nodes may be greater or lesser than what is depicted. A layer may include nodes of a same vertical column. Moreover, one or more action nodes may be associated with an undepicted prediction node that indicates a predicted state that would result based at least in part on the candidate action(s) indicated by one or more candidate nodes. This predicted state may be based at least in part on a simulation/prediction of dynamic object data and/or environment states, which may include signage changes, signal changes, and/or the like.

In some examples, determining the cost may be determined based at least in part on simulating dynamic object(s) position(s), velocity(ies), and/or the like relative to the vehicle as the vehicle is simulated as traversing the candidate action. Additionally or alternatively, the cost function may determine a variety of sub-costs such as proximity cost(s), safety cost(s), comfort cost(s), and/or progress cost(s). These sub-costs may be based at least in part on the state data indicated by the last prediction node (whether the last prediction node is the root node or another prediction node). The proximity cost(s) may be based at least in part on a minimum, average, or other distance that the candidate action would take the vehicle from a static and/or dynamic object as the vehicle traverses the candidate action. The safety cost(s) may include a score indicating conformance to rules of the road, proximity to other object(s), and/or proximity to a non-drivable surface (e.g., sidewalk, building, closed lane). The comfort cost(s) may be based at least in part on a jerk and/or acceleration associated with the candidate action and/or whether the candidate action would violate a threshold jerk and/or acceleration. The progress cost(s) may be based at least in part on completion of a mission or sub-goal (e.g., parking at a portion on a block, parking within a block, changing lanes); displacement of the vehicle along the route; and/or deviation of the vehicle from a center of a lane, deviation from a desired lane for accomplish the route, or deviation from the route. For example, the progress cost(s) may reward the further the vehicle would be along the route if the candidate action were executed. A cost that is calculated as a reward may have an opposite sign as the other sub-costs. For example, if there is a positive cost for a candidate action that would violate a comfort metric (e.g., the candidate action would exceed a threshold jerk), a reward may be a negative sub-cost.

In at least one example, the cost associated with a particular action node may include a cost of arrival (e.g., a sum of the costs of all the action node(s) leading up to that action node for any action node deeper than the first layer) and/or a cost to execute the action, i.e., a transition cost (e.g., which may include the cost(s) discussed above, such as the comfort cost(s), progress cost(s), etc.), and/or a cost to progress further after that action node, which may be the minimum or average estimated cost for a next layer of prediction nodes after the target prediction node 348 (undepicted due to spatial constraints).

In other words, the cost function includes a variety of computations that are based on both simulated and non-simulated data. The cost determined by the cost function may be used to determine one candidate action from among multiple candidate actions for use to construct a path for controlling the vehicle. In at least one example, determining the simulation/prediction may comprise executing a prediction component of the vehicle, which may execute a Kalman filter, machine-learned model, and/or a simulation. Running a simulation may comprise instantiating the simulation based at least in part on the environment state data and the first candidate action. The instantiation may use a set of template models that may include representations of various objects, such as three different passenger vehicle models, four different pedestrian models, and/or the like, which may be scaled and positioned as appropriate to match the state data indicated by the prediction node upon which the candidate action was based. Any number of different models may exist. In some examples, a template model may comprise a three-dimensional model of a surface of an object without any texturing, although in additional or alternate examples, the model may comprise texture, or a two-dimensional top-down representation of such objects. The template model may comprise a polygon mesh, a triangle mesh, top-down representation of a portion of the environment that is occupied by different objects, and/or the like. In some examples, models associated with dynamic objects may have a higher polygon count than models associated with static objects for examples where a three-dimensional representation is used. In yet another example, objects in the simulation may be simplified to basic two-dimensional or three-dimensional geometric shapes, corresponding with the dimensionality of the simulation. For example, vehicles and/or pedestrians may be represented as rectangles of different shapes, pedestrians may be represented as cylinders or circles, etc.

Additionally or alternatively, determining the total cost 364 for one of the candidate actions determined for a prediction node may comprise determining a transition cost associated with the candidate action and summing that transition cost with the transition cost(s) of repeating a default action thereafter until the termination point is reached. These transition costs may similarly be based at least in part on safety, progress, comfort, and/or the like. The default action may include, for example, repeating the candidate action, maintaining an action indicated by the first candidate action (e.g., continue turning, continue braking), maintaining operation in a same lane associated with a future state that would be achieved by the first candidate action, going straight in a lane, and/or the like. This total cost

364 may also be referred to herein as a predicted cost and is determined by the cost function.

In some examples, the total cost 364 may further comprise a terminal cost associated with a prediction node at the maximum depth of the tree. The terminal cost may account for the fact the tree isn't infinitely explored and may be a static heuristic cost or may be determined by a machine-learned model or a separate cost function specifically designed for determining the terminal cost associated with the deepest node in the tree search. In some examples, the machine-learned model or terminal cost function may determine the terminal cost based at least in part on the environment state data, dynamic object data, vehicle state, and/or the like. For example, the terminal cost may be based at least in part on a distance of the vehicle to a nearest object, a distance of a last action (e.g., a default action for determining the predicted cost or a candidate action if the tree search is reaching the deepest layer of the tree) or extrapolation of the last action or path of the vehicle to a nearest object, a jerk or acceleration associated with the last action, and/or the like. This terminal cost may be added to the transition cost(s) of the candidate action and any default actions to reach the maximum depth of the tree. For example, the candidate action indicated by action node 360 may be associated with a maximum depth of the tree (e.g., 6, 8, or 10 seconds in the future or any other time when the termination point is defined by a time, a location or vehicle state when an objective is used as the termination state, a displacement in meters along the route). Accordingly, the candidate action indicated by action node 360 may result in a predicted state that is associated with the termination point and has a terminal cost associated therewith that may be added to the total cost 364.

Once the simulation is complete (e.g., upon completing the candidate action in the prediction/simulation), the resulting predicted track(s) (e.g., position(s), orientation(s), etc. as discussed above) of the object(s) in the environment, including vehicle 306's resultant track from executing the first candidate action, may be used to determine updated environment state data and/or prediction node data associated with the objects. The data structure 356 may be updated to include a prediction node 354 and/or any prediction nodes associated with action nodes 358 that indicates this updated environment state data and the prediction node data associated with the dynamic object(s) as a result of the prediction/simulation that may result from implementing the first candidate action. In some examples, the simulation may be re-executed using slightly different variables (e.g., changing a propensity of a dynamic object from "conservative" to "aggressive," "deferential," or "nominal") to determine alternate updated environment state to additionally or alternatively associate with prediction node 354 and/or any prediction nodes associated with action nodes 358. In some examples, the simulation component may output multiple potential scenarios, each of which may be associated with a likelihood. In such an example, the tree search may create a prediction node for each potential (predicted) scenario that is associated with a likelihood that meets or exceeds a likelihood threshold or the different scenarios may all be associated with a same prediction node.

At operation 366, example process 300 may comprise using the cost determined at operation 362 as ground truth for training the cost estimation architecture discussed herein. For example, loss function discussed herein may determine a difference between the estimated cost generated by the architecture 234 and the minimum total cost from among multiple total costs determined by the cost function and associated with the different possible paths that stem from prediction node 354. In particular, a training system may determine a loss (e.g., L1 loss, L2 loss, Huber loss, square root of the mean squared error, cross entropy loss, Wasserstein, or another loss function) based at least in part on a difference between the estimated cost and the cost. This loss may be used in a gradient descent or other technique for modifying one or more parameters of different components of the cost estimation architecture to reduce the loss. For example, the parameter may comprise a weight/coefficient, bias, kernel values or characteristics, and/or the like. In the depicted example, the loss may determined based at least in part on a difference between the estimated cost associated with prediction node 354, "4.3," and the total cost 364, indicated as being "4.8," which may have been the lowest total cost among the paths that were generated based at least in part on prediction node 354. During training, the cost function may be used to determine a cost associated with a prediction node that was not selected for exploration. For example, the cost function may be used to determine costs associated with all the prediction nodes or a subset of the prediction nodes and an aggregate loss or separate losses may be determined based at least in part on differences between the costs determined by the cost function and estimated costs determined by the cost estimation architecture discussed herein. In other words, during training the tree may be searched more expansively than is conducted on the vehicle 202.

At operation 368, example process 300 may comprise controlling the vehicle based at least in part on a path that comprises one or more candidate actions based at least in part on a total cost associated with the path. For example, the process 300 may comprise iteratively repeating operations 336, 346, 362, and 362 until an end point along the route is reached or a time horizon is reached (e.g., part of a Bellman update). Additionally or alternatively, the path may comprise one or more candidate actions following the prediction node 354. The planning component may determine the path and associated set of controls by determining a series of action nodes and a series of prediction nodes that are associated with a lowest total cost or a cost that is below a threshold total cost to determine the path. In other words, the path may comprise the candidate actions indicated by the solid action nodes leading up to action node 360 (associated with the termination point, e.g., an end position, displacement along the root, time horizon) that are based on prediction node 354. Additionally or alternatively, the process 300 may iteratively repeat this process until a termination event, such as determining a predefined number of action nodes, a time limit for the computation, a computation or storage limit, a displacement along the route is achieved, or a number of time steps has been reached (e.g., actions up to a time horizon have been determined), etc.

During this process, the planning component may keep a running total of the estimated costs and/or the costs determined by the cost function to determine the total cost of the path that has been explored so far in the tree search. In some examples, the path may further comprise candidate actions associated with action nodes that come before the prediction node 354 and the total cost may be a running total that includes cost(s) associated with such action nodes. In some examples, the planning component may revert to an earlier prediction node in the tree search if the total cost meets or exceeds an upper total cost threshold. In such an instance, the planning component may exclude previously explored prediction nodes from consideration unless exploring a different prediction node results in a higher total cost.

In some examples, the tree search may determine one or more contiguous paths through the sets of action nodes as the sets of nodes are generated and/or termination event occurs/an end point is reached. In some examples, the tree search may trace one or more potential paths through the sets of action nodes as they are generated and back-trace a lowest-cost path (i.e., from a node at the end of the potential path in a last layer of nodes to a start point/the root node and/or at a current position of the vehicle) to ensure it is impact-free. Regardless, the tree search may determine a contiguous path through the sets of nodes that is associated with a lowest cost and/or that makes the most progress along the route. A contiguous path of action nodes is a set of nodes that are connected by a dependency in the data structure 332/356. For example, conducting the search may comprise determining a contiguous set of connections between nodes of the different sets of nodes from the root node to an action node in a deepest layer of the data structure 332/356. Determining the path may comprise searching for solutions in the multivariate space that maximize a combination of displacement along the route and lateral/azimuthal diversity among the solutions (or meet a diversity heuristic) and minimize cost based at least in part on the cost map in the time interval given. For example, the search algorithm may comprise an algorithm such as, for example D*, D*lite, Focused Dynamic A*, A*, LPA*, Dijkstra's algorithm, and/or the like, although other search algorithms for searching and/or generating a directed graph and/or a weighted directed graph may be used. In some examples, the search may be configured with a ruleset that may comprise one or more rules, e.g., specifying a boundary within which to determine the path (e.g., the boundary may be determined based at least in part on sensor data and/or a map), node connection rules (e.g., nodes may have only one parent node), and/or the like. In some examples, the search may comprise determining a directed graph between nodes of the sets of nodes. The directed graph may comprise a connection (e.g., edge) between a first node and a second node and/or weight (e.g., cost) associated with the connection.

In some examples, before conducting a full search for a path, the tree search may comprise determining if a previous path and/or previous connection determined by the guidance system is feasible (e.g., satisfies current constraints such as velocity, maximum steering angle, and/or boundaries; is impact-free; has a cost that is less than a cost threshold).

In some examples, the path determined by the tree search may be a coarse path. For example, the coarse path may identify a position, heading, velocity, and/or curvature of approach for the vehicle to track at a 1 second or 500 millisecond interval, but the components of the vehicle may require or be capable of control over a finer time interval (e.g., 10 milliseconds, 100 milliseconds). In other words, the coarse path may not be smooth enough for the vehicle to track without significant errors. In some examples, a processor of a first type (e.g., a graphics processing unit (GPU)) may determine the prediction nodes and action nodes and/or determine the path and a processor of a second type may smooth the path generated by the GPU and/or determine a trajectory for controlling the vehicle based at least in part on the smooth path.

The tree search discussed herein may identify a path as feasible and/or determine a confidence score associated with the path based at least in part on the costs discussed herein. The tree search may output the path and/or confidence score, which the autonomous vehicle may use to control motion of the autonomous vehicle, e.g., by generating a trajectory based at least in part on the path. In some examples, the tree search may output a primary path and/or a contingent path. For example, the tree search may determine the contingent path based at least in part on generating a set of candidate paths, determining that the set comprises two groups of candidate paths based at least in part on a threshold distance (e.g., the two groups may be two distinct homotopic groups), and selecting a primary path from a first group and a contingent path from the second group. In some examples, the primary path may be selected as the primary path based at least in part on determining that the primary path is associated with a first total cost that is less than a second total cost associated with the contingent path. The primary path may be associated with a first total cost and/or the contingent path may be associated with a second total cost that is/are less than a cost threshold and/or may be minimum costs of the respective groups associated therewith. As such, the techniques described above may reduce the total computational requirements to identify and evaluate the most likely branches of a tree to explore. Of course, though described in the context of guidance of a tree search of trajectories for an autonomous vehicle, similar techniques may be applied in other tree search techniques.

Example Cost Estimation Architecture Input Data

Figure 4:
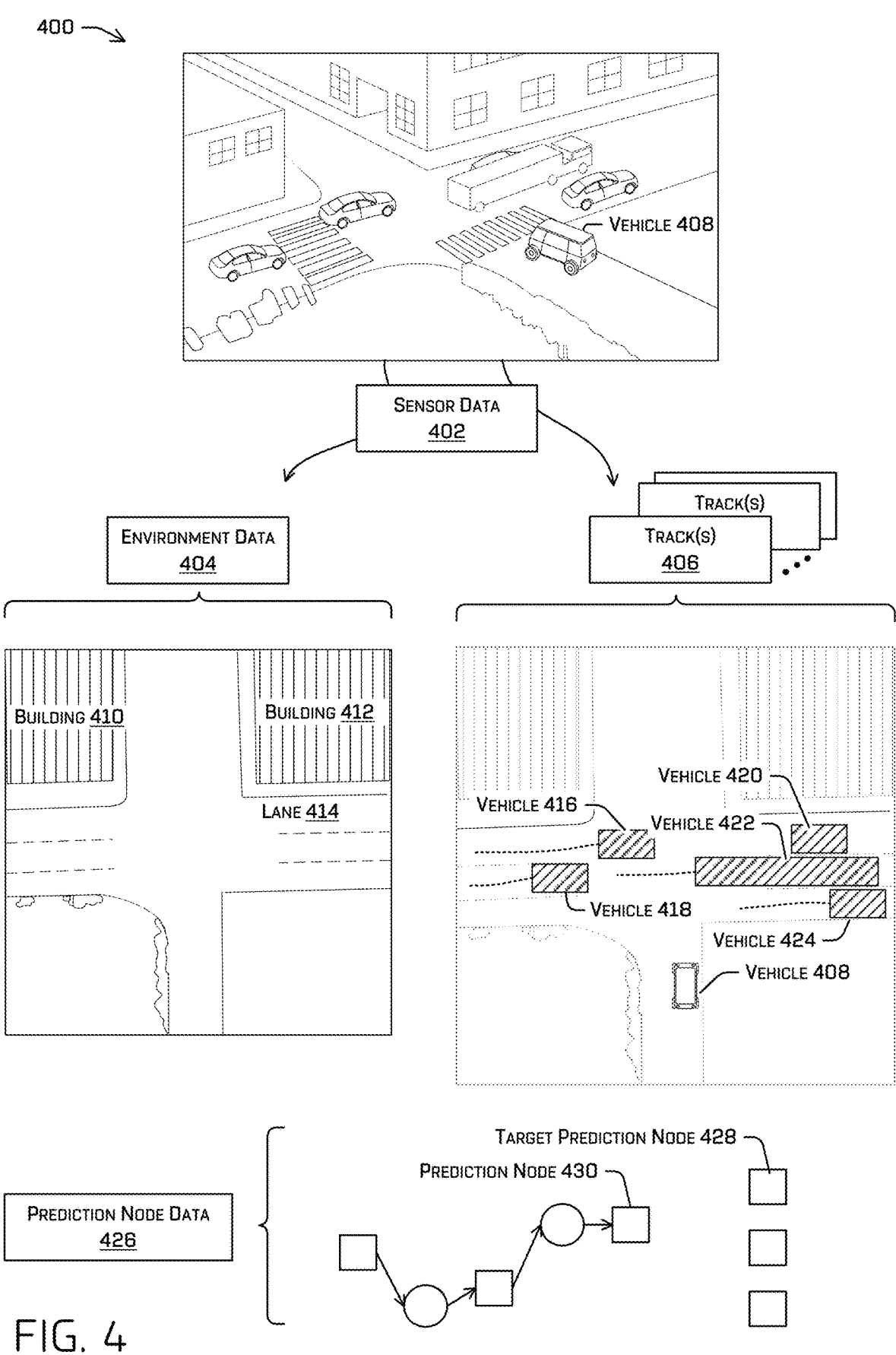
FIG. 4 depicts example representations of environment data, track(s), and prediction node data used as input for the cost estimate architecture.

FIG. 4 depicts example representations of environment state data, track(s), and prediction node data used as input for the cost estimate architecture 234 (e.g., a machine-learned model) discussed herein for an example scenario 400. The vehicle 202 may receive sensor data 402 and may use the sensor data to determine environment state data 404 and track(s) 406 (also called dynamic object data herein). The environment state data map comprise map data retrieved from memory that may be a pre-generated map that indicates the location, orientation, and/or classification of various objects, such as, for example, roadways, lanes, signage (e.g., traffic signs, traffic lights, billboards, crosswalk hashes, taxi zone indicators), buildings, permanent objects, construction, known occlusion data based on the position of vehicle 408 (which may represent vehicle 202) determined using the localization component of the vehicle, etc. The vehicle 408 may further augment the environment state data with data determined based at least in part on sensor data and/or the route determined by the vehicle according to a mission. For example, the vehicle 408 may aggregate with the map data static object(s) detected by a perception component of the vehicle, signal state data (e.g., traffic light indications, commuter lane signal states), and/or a route that the vehicle 408 generated based at least in part on a mission received by the vehicle that may indicate passenger and/or package pickup and/or drop-off location(s).

The example environment state data 404 may include, for example, an indication of the locations of building 410, building 412, lane 414, location(s) and extents of sidewalks, the locations of static object(s), and/or any of the other discussed herein. In some examples, the environment state data may include a top-down representation of the environment having multiple channels, where each channel indicates the absence or existence of any of the data discussed herein. For example, at the portion of the environment state data associated with the building 410, a channel of the environment state data may be set to indicate the existence of a building, such as by a binary indication, and a channel associated with crosswalks may indicated that no crosswalk exists at the same space occupied by building 410. As can be perceived by this example, there are examples where different channels may both indicate the existence of a feature. For example, a roadway channel may indicate that a portion of the environment is associated with a roadway, a lane channel may also indicate that that portion is also associated with a lane, and a crosswalk channel may also indicate that that portion is also associated with a crosswalk.

The vehicle 408 may additionally or alternatively determine a track associated with a dynamic object detected by the perception component of the vehicle. For example, the vehicle 408 may assign an identifier to any object classified by an ML model of the perception component as being capable of movement or of changing states (e.g., a traffic light may change states and may have historical and/or current detection data associated therewith) and may associate that same identifier with all data generated by the perception component that relates to that same object. This data may collectively be aggregated over time to form a track that identifies a current and historical state of such an object. This state may indicate the position, orientation, classification, velocity, acceleration, sub-state (e.g., vehicle indicator state; pedestrian state such as walking, vehicle loading, intent to cross roadway; aperture open/closed state, loading/unloading, signage state), and/or the like. A track may therefore include this data over a previous time window, such as a time period extending from a current time to 3 seconds in the past, 5 seconds in the past, 10 seconds in the past, or any other suitable length of time. There may be as many track(s) as there are dynamic object(s) detected by the vehicle 408 or the track(s) may be limited to those within a predefined distance of the vehicle, where the predefined distance may be based at least in part on a velocity of the vehicle 408 and/or of a velocity of a dynamic object detected by the vehicle 408. For example, there may be a track associated with each of vehicle 416, vehicle 418, vehicle 420, vehicle 422, and/or vehicle 424 illustrated in FIG. 4. The previous positions indicated by the different tracks are illustrated as dashed lines associated with each of the vehicles. Note that, although vehicle 420 may be occluded to one or more sensors of vehicle 408, vehicle 408 may maintain a track associated with vehicle 420 until an amount of time has passed before removing the track, so that the cost estimation architecture discussed herein can take into account potentially occluded objects.

FIG. 4 further illustrates an example of prediction node data 426 used by the vehicle as part of the input data for the cost estimation architecture 234 discussed herein. As discussed above with reference to FIGS. 3A-3C, determining a cost associated with a candidate action to reach a prediction node may comprise predicting the location, orientation, velocity, and/or acceleration of an object and/or of the vehicle itself as it carries out the candidate action. The predicted state of objects in the environment that results from the candidate action that is ultimately selected by the tree search may be associated with the prediction node that is reached by the action node. The prediction node data 426 may comprise a data structure that encodes a trace. The trace may indicate the prediction node data associated with the prediction nodes and/or candidate nodes up to the prediction node for which a new cost estimate is being generated, e.g., target prediction node 428 in the depicted example. For example, the trace may indicate a series of candidate actions and/or future states that lead up to a target prediction node 428. In generating a cost estimate for a prediction node, the architecture 234 may use at least the trace for that prediction node but may additionally or alternatively use a trace determined for a prediction node of a different branch of the tree. The depicted example illustrates a series of prediction nodes as squares and action nodes selected to reach such prediction nodes as circles. The target prediction node 428 has two other peer prediction nodes in the same layer for which cost estimates may also be generated. In other words, the prediction node data 426 may be used for generated cost estimates for the target prediction node 428 and the other prediction nodes that are as-of-yet unexplored (hence the absence of any candidate actions connecting the previous prediction node to any of these nodes). At a high level, the prediction node data 426 encodes how prediction node 430 was reached and the predicted state of the environment/objects in the environment at that prediction node, which is associated with a future time.

Note that the prediction node data 426 may be different for two prediction nodes that have different parent prediction nodes since the two different prediction nodes would be associated with two different predicted states. Moreover, two prediction nodes having a same parent prediction node would be differentiated in their trace by the candidate actions for reaching them from the previous state indicated by parent prediction node. In some examples, the prediction node data 426 and/or candidate node(s) may further indicate a position of such a node in the tree search, such as relevant to other nodes, a depth in the tree, and/or the like.

Figures 5A, 5B, 5C:
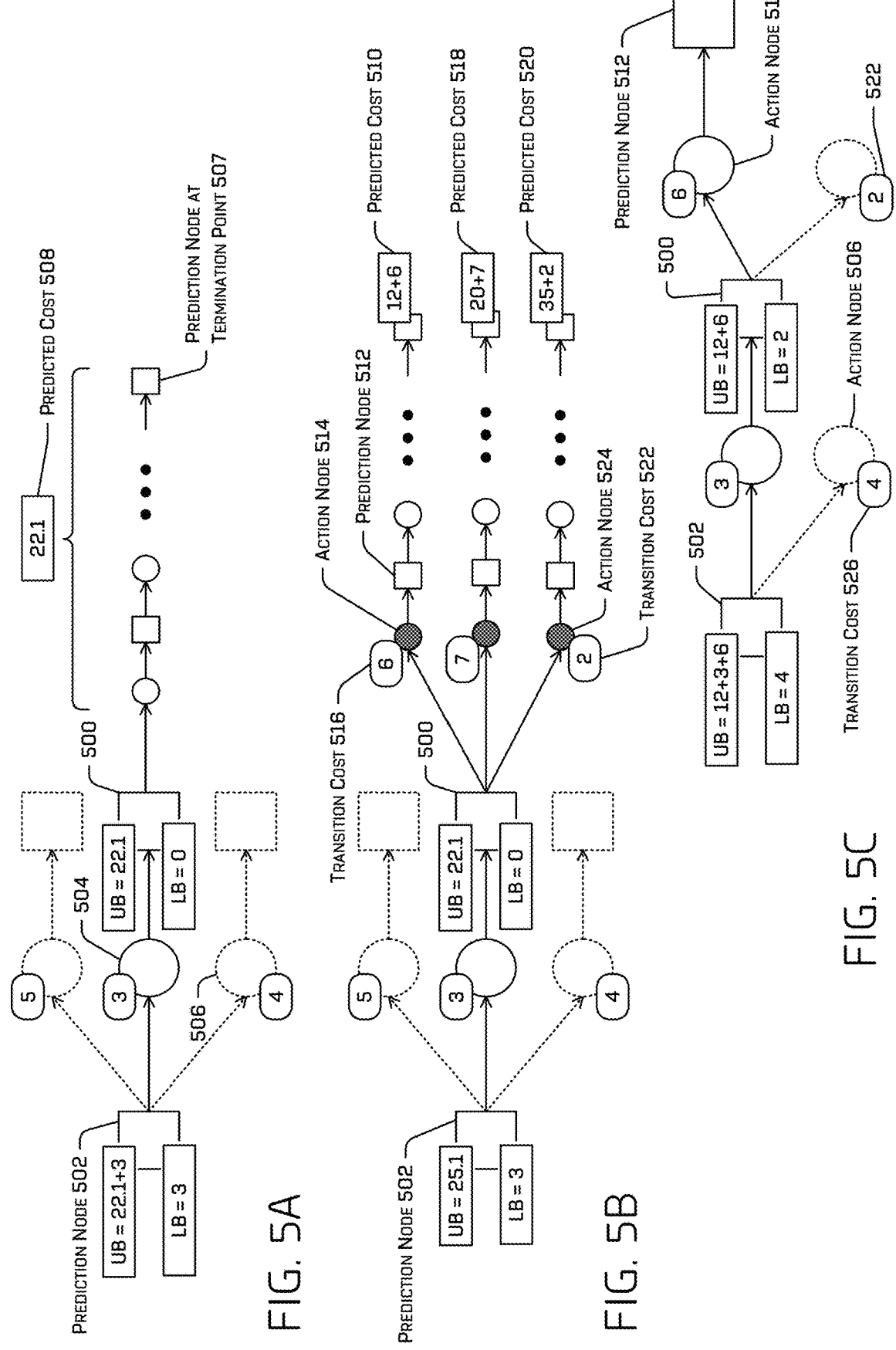
FIGS. 5A-5C depicts a diagram of an example process for determining an upper bound cost and a lower bound cost for a prediction node.

Example Process to Determine a Cost Estimate for a Tree Search Using the Cost Estimation Architecture FIGS. 5A-5C depicts a diagram of an example process for determining an upper bound cost and a lower bound cost for a prediction node and backpropagating the costs determined to update the upper bound cost and lower bound cost of any prediction nodes that are upstream from the prediction node 500 in the same branch of the tree. The upper bound cost associated with a prediction node may be the lowest calculated cost of reaching the termination point from a state indicated by the prediction node and the lower bound cost associated with a prediction node may indicate the lowest calculated cost of moving from the state indicated by the prediction node. Determining the upper bound cost and the lower bound cost may be part of determining the loss for training the architecture 234 and/or may be part of determining a path for controlling the vehicle. For example, the cost estimate determined by the architecture 234 may be used to determine a prediction node to explore in a next layer of the tree in order to potentially add to the path candidate action(s) that stem from the prediction node. Determining the upper and/or lower bound costs may be used to determine whether there is a suitable candidate action to take from the prediction node and to update a predicted cost of continuing to explore the branch of the tree that includes the prediction node that is currently being explored. The upper and lower bounds determined for a prediction node may be used to update the upper and/or lower bound costs of prediction node(s) upstream from the prediction node. This feature may be used so that if an upper bound cost (e.g., the lowest predicted cost) determined for a prediction node is higher than an upper bound of a previous prediction node in the branch, the tree search may return to that previous prediction node to explore a different candidate action therefrom or may return to the previous prediction node's layer to determine a new prediction node for exploration. The upper bound cost is indicated as "UB" and the lower bound cost is indicated as "LB" in FIGS. 5A-5C.

Note that depth in the tree search may be defined depending on the termination point. Where the termination point is a future time, a level or depth may be a discrete time from a current time to the future time associated with the termination point. In examples where the termination point is displacement along a route, the level or depth of the tree may be defined by a progress/displacement along that route that increases with progress towards the termination point. Moreover, a first prediction node may be in a same branch as a second prediction node by a candidate action or series of candidate actions that lead from a state indicated by one of the prediction nodes to a state indicated by the other of the prediction nodes. Additionally, the first prediction node may be considered downstream from the second prediction node if a candidate action or series of candidate actions that start from a state indicated by the second prediction node would result in the state indicated by the first prediction node. Contrarily, the first prediction node may be considered upstream from the second prediction node if a candidate action or series of candidate actions that start from the state indicated by the first prediction node would result in the state indicated by the second prediction node. These upstream/downstream and branch relationships are indicated in the tree by a set of nodes that lie between the respective prediction nodes.

FIG. 5A depicts a tree that is in the process of being expanded by the tree search. At the iteration of the tree search depicted in FIG. 5A, the tree includes a prediction node 502, three action nodes depicted as circles (e.g., including action node 504 and action node 506), and three prediction nodes depicted as squares. Note that although the depiction of a tree includes three action nodes indicating different candidate actions that result in three future states indicated by three different prediction nodes, the number of candidate actions (and resultant states) may be greater or lesser than three. Moreover, the action nodes 504 and 506 may indicate different actions that may be taken by the vehicle. Accordingly, even if the same default action is used to determine a predicted cost for reaching the termination point, since the shallowest action in the branch to determine the predicted cost is different, the cost(s) determined by the cost function for the default actions to reach the termination point may differ in addition to the transition costs determined for two different action nodes being different.

The prediction node 502 may be the root node or a prediction node that is deeper in the tree than the root node. In the latter example, the depicted tree is a partial tree where other shallower nodes and prediction nodes in the same layer as the prediction node 502 are undepicted. In an example where the prediction node 502 is the root node, the prediction node 502 may indicate a current state; whereas if the prediction node 502 is deeper in the tree than the root node the prediction node 502 may indicate a future state.

The tree search may have selected the prediction node 500 for expansion/exploration based at least in part on a cost estimate generated by the cost estimate architecture for the prediction node 500 being lower than other estimated cost(s) associated with other prediction nodes of a same layer as the prediction node 500 (e.g., the dashed prediction nodes that are depicted as being dashed since they haven't been selected by the tree search for exploration/expansion). For example, the cost estimate may have been 27 (undepicted), whereas the cost estimate for the other prediction nodes may have been greater than 27. The estimated cost determined by the architecture 234 may be an estimated upper bound cost for a prediction node.

The upper bound and lower bound costs associated with the prediction node 502 may have already been determined based on a process similar to that described regarding FIG. 5B where a predicted cost for each prediction node is determined based at least in part on a transition cost for the candidate action to reach the prediction node plus the transition cost(s) of repeating a default candidate until the termination point plus a terminal cost associated with the prediction node at a termination point 507. For example, the upper bound cost (UB) for the prediction node 502 is the minimum of the predicted costs determined for the prediction nodes of the same layer as prediction node 500. In the depicted example this may be the predicted cost 508 associated with a branch that includes the prediction node 500, i.e., 25.1, which is the sum of the transition cost for reaching prediction node 500 (i.e., 3) plus the sum of the transition costs of repeating a default action until a termination point (22.1) plus the terminal cost associated with the prediction node at the termination point 507 (undepicted for simplicity).

As discussed above, the terminal cost may be a heuristic/set cost or may be determined by a machine-learned model or a separate cost function specifically designed for determining the terminal cost associated with the deepest node in the tree search. The terminal cost may account for the fact the tree isn't infinitely explored. In some examples, the machine-learned model or terminal cost function may determine the terminal cost based at least in part on the environment state data, dynamic object data, vehicle state, and/or the like associated with the deepest prediction node in the search tree, such as the prediction node at termination point 507. In examples where a terminal cost is used, all the upper bound values may additionally include the value of the terminal cost but this is undepicted to enhance understanding of the underlying costs for determining the upper bound cost.

Note that the predicted costs for the other branches from the prediction node 502 may include the transition cost of the first candidate action (e.g., 4 for the prediction node below prediction node 500) plus transition cost(s) of a default candidate to reach a termination point thereafter and the terminal cost. Note that the transition costs of the default action may be different for the default actions that follow action node 506 since the action indicated by the action node 506 is different than the action indicated by the action node 504. Accordingly, repeating a default action after action node 506 may result in a different predicted cost 508.

The lower bound cost for the prediction node 502 may be the lowest total transition cost for an action node that has been determined for a branch that stems from the prediction node 502. In other words, transition costs for default actions aren't counted. Transition costs are illustrated as numbers in rounded rectangles overlaying the action node for which they are associated. For example, the transition cost for action node 504 is 3 and the transition cost for the action node 506 is 4. Since no other transition costs have been determined yet (for action nodes of a deeper layer), the lowest total transition cost to move from the state indicated by prediction node 502 is 3. Accordingly, the lower bound cost for prediction node 502 at the iteration of the tree search depicted in FIG. 5A is 3.

In the iteration of the tree search depicted at FIG. 5A, the prediction node 500 may have been selected for exploration/expansion based at least in part on determining an estimated cost for the prediction node 500 by the architecture 234. In some examples, the upper bound of the prediction node 500, which has been selected for expansion, may be set to be the predicted cost 508, which was determined for the prediction node 502 as part of determining the upper bound cost. Note that setting the upper bound for the prediction node 500 to be the upper bound cost for the parent prediction node (i.e., 502) of prediction node 500 is just an estimate of the upper bound cost to reach the termination point from the parent prediction node 502 in a branch that includes the prediction node 500. As part of the tree search the tree search may update the upper bound cost associated with the prediction node 500 based at least in part on exploring/expanding the prediction node. Additionally or alternatively, the tree search may update the lower bound cost associated with the prediction node 500. As-of-yet in the iteration of the tree search shown, no transition costs have been determined for any candidate actions following the prediction node 500 (besides the cost(s) determined by the cost function for default action(s), which aren't used for determining the lower bound cost for a prediction node). Accordingly, the lower bound cost associated with the prediction node 500 is zero at the iteration shown. The lower bound cost determined for prediction node 500 may also be updated by the tree search as part of expanding/exploring the prediction node 500.

At FIG. 5B, the tree search may expand/explore the prediction node 500 by determining a set of candidate actions that the vehicle could execute from a state indicated by the prediction node 500. These candidate actions are indicated by action nodes depicted as the first circles that follow the prediction node 500 (left-to-right) and have a gray fill. The candidate actions indicated by these action nodes may each be different from each other. To update the upper bound and lower bound cost associated with the prediction node 500, the tree search may determine a predicted cost for a (up to each) predicted state/prediction node that will result from a candidate action based at least in part on rolling out the candidate action to a termination point. Rolling out the candidate action may be another way of referring to determining a branch that includes the candidate action and a series of default actions to reach the termination point. To determine the predicted cost associated with a prediction node that would result from one of the candidate actions, the tree search may determine a transition cost associated with the candidate action and a sum of the transition costs for the default action(s) for reaching the termination point plus the terminal cost.

For example, the predicted cost 510 for a prediction node 512 that would result by implementing a candidate action indicated by an action node 514 to operate from the state indicated by prediction node 500 may comprise a transition cost 516 determined for the candidate action (i.e., 6) plus the transition cost(s) of a series (one or more) of default actions repeated until the termination point (i.e., 12) plus the terminal cost (undepicted). Accordingly, the predicted cost 510 would be 18 (plus the undepicted terminal cost, which may be the same for each predicted cost and accordingly ignored for this particular discussion). The predicted costs for the other depicted prediction nodes may include predicted cost 518 and predicted cost 520, both of which are greater than predicted cost 510. Note, however, that the transition cost 522 of a different candidate action indicated by action node 524 for operating from the state indicated by prediction node 500 is lower than the transition cost 516 for using the candidate action indicated by action node 514 to operate from the state indicated prediction node 500. This may mean that the cost function may determine a lower cost action for a series of actions that start with the candidate action indicated by action node 524 compared to starting with the candidate action indicated by action node 514, but that, ultimately, the total cost of such a series of candidate actions starting with the candidate action indicated by the action node 514 may be cheaper.

At FIG. 3C, the tree search may update the upper bound cost(s) and lower bound cost(s) of any prediction nodes for the branch of the tree that has been further explored/expanded. In this instance, such a branch includes prediction node 502 and prediction node 500. The upper bound cost for a prediction node may be the minimum predicted cost for a branch from the prediction node plus the total transition costs determined so far for operating along the branch. For the depicted example that may include updating the upper bound cost for the prediction node 500 to be the cheapest predicted cost determined from the prediction node 500, which would be predicted cost 510, i.e., 18, which is the predicted cost 18 (i.e., the predicted cost, 12, plus the transition cost 516 of the action node 514 that results in the cheapest total predicted cost). Updating the lower bound cost of the prediction node 500 may comprise determining the minimum total transition cost (determined so far) of operating from the prediction node 500, which is the transition cost 522. Accordingly, the lower bound cost of operating from the state indicated by the prediction node 500 would be 2 since the cheapest sum of transition costs of operating from the prediction node 500 is only one layer deep so far and the cheapest transition cost is transition cost 522, i.e., 2.

Similarly, the tree search may update the upper and lower bound costs of any prediction nodes of layers before the deepest layer that has been explored/expanded. These prediction nodes may be updated based at least in part on the newly expanded prediction node. For example, the upper bound cost of prediction node 502 may be updated to be the cheapest predicted cost determined from the prediction node 502, which would be predicted cost 510 plus any intervening transition costs. Since predicted cost 510 includes the transition cost 516, the updated upper bound cost for prediction node 502 would include the predicted cost 510 (i.e., 18=12+6) plus the transition cost of the action node for reaching that cheapest predicted cost 510, i.e., the transition cost of action node 504 (i.e., 3), for a total of 21. The lower bound cost for the prediction node 502 may also be updated to be the minimum total transition cost of operating from the prediction node 502. Since the minimum transition cost for proceeding along action node 504 and its subsequent transition cost is now 5 (i.e., 3+2, the transition costs of action node 504 and action node 524), that total transition cost exceeds the total transition cost 526 of action node 506 (i.e., 4). Accordingly, the lower bound for the prediction node 502 may be determined to be 4 since the lowest determined total transition cost of operating from the state indicated by prediction node 502 is 4, at least as has been determined so far by the tree search. Note that the newly determine total cost of operating from the prediction node 502 along the branch associated with action node 504 would be 5 (i.e., the total of the transition cost 526 for action node 504 and the transition cost 522 associated with action node 524), which is greater than 4, the total transition cost for operating from prediction node 502. Further note that it doesn't matter that further transition costs have not yet been determined for a branch from action node 506 since the lower bound merely indicates the lowest total transition cost for operating from a prediction cost as has been determined so far by the tree search.

In some examples, since the upper bound associated with prediction node 500 is still the lowest upper bound cost determined so far, the tree search may determine a set of candidate actions that stem from prediction node 500 (undepicted and cost estimates for the prediction nodes that result from those candidate actions). The tree search may use those cost estimates to determine to explore prediction node 512. For example, the cost estimate associated with prediction node 512 may be a minimum from among cost estimates associated with the prediction nodes of a layer that is deeper than prediction node 500 or that is at least below a cost estimate threshold.

Example Process and Loss Function for Training the Cost Estimation Architecture

FIG. 6 depicts a flow diagram of an example process 600 for training a cost estimate architecture (e.g., architecture 234) using a loss function that mitigates the effects of not searching the tree to an infinite horizon and/or using unconverged values to train the cost estimate architecture. In some examples, example process 600 may be executed by computing device(s) 214 as part of training or refining architecture 234, although, in other examples, the example process 600 may be executed in part or totally by vehicle computing device(s) 204.

Since it may be easier to follow the ensuing discussion, the loss function is introduced up front and discussed in more detail below. The loss function for training the machine-learned model (e.g., architecture 234) may be given by:

$$L(\text{branch}) = L[V(b_0), LCTG(b_0)] + \tag{1}$$

$$\beta \sum_{n=0}^{d} \left\| LCTG(b_n) - \gamma E\left(LCTG\left(b^{a^*}_{n+1}\right)\right) - c(b_n, a^*) \right\|,$$

where:

V($b_0$) is the upper bound cost determined by the cost function for the root node (e.g., using the process described regarding FIGS. 5A, 5B, and/or 5C;

LCTG($b_0$) is the estimated cost (learned cost to go, (LCTG)) determined for by the machine-learned model for the root node when the tree has reached n-th depth of the tree;

n is the current depth of the tree;

β is a value chosen to weigh the second sub-loss (which functionally weighs the extent to which the machine-learned model is trained to learn the magnitude of the cost estimate);

$b_n$ is the prediction node at the current deepest level of the tree, n, (e.g., the prediction node for which an estimated cost was just determined);

d is the maximum depth of the tree search (e.g., which may be associated with the termination point);

LCTG($b_n$) is the estimated cost determined by the machine-learned model for the prediction node;

γ is a decay or discount factor;

E is the statistical expectation (although if only one prediction node is determined for the layer this may be ignored);

$$LCTG\left(b^{a^*}_{n+1}\right)$$

is the estimated cost for the next prediction node given the optimal action, a*, to take to arrive at the next prediction node, $b_{n+1}$; and c($b_n$, a*) is the transition cost determined by the cost function for the optimal action. The loss function may be determined for a branch of the tree from the root node to the prediction node for which the estimated cost has been determined by the machine-learned model, i.e., L(branch). The loss, L, may be a mean squared error, cross entropy, Wasserstein loss, or any other suitable loss.

This loss function comprises a first sub-loss, L[V($b_0$), LCTG($b_0$)], and a second sub-loss, $$\beta \sum_{n=0}^{d} \left\| LCTG(b_n) - \gamma E\left(LCTG\left(b^{a^*}_{n+1}\right)\right) - c(b_n, a^*) \right\|,$$

which may be summed together. The first sub-loss may mitigate the effects of the terminal cost increasingly influencing the output of the machine-learned model and, accordingly, causing the estimated cost by the machine-learned model becoming more inaccurate for prediction nodes the deeper they are into the tree. As a reminder, the terminal cost is used to cap the horizon on the tree search so that the tree isn't explored infinitely. However, using the first sub-loss alone helps the machine-learned model learn the difference in estimated cost for taking different actions, but isn't as well suited to helping the model learn the magnitude of the estimated cost. The second sub-loss may help train the machine-learned model the magnitude of the cost estimate.

However, the formulation of the loss function given above may require convergence to determine the optimal action to take, a*. In other words, the truly optimal candidate action to use at each layer of the tree cannot be known without the tree search converging. To address this issue, the loss function discussed further herein may use one or both of two techniques discussed at operation 610(*a*) and/or (*b*) to modify the loss function to mitigate the difference between the lowest cost action to transition from a prediction node and the cost of the optimal action.

At operation 602, example process 600 may comprise determining, by a machine-learned model, a first estimated cost of operating a vehicle from a first vehicle state indicated by a prediction node of a tree to a termination point, according to any of the techniques discussed herein. In some examples, the machine-learned model may determine the first estimated cost based at least in part on environment state and/or prediction node data. The environment state data may indicate an environment state such as map data, dynamic object data, vehicle data, and/or the like. The prediction node data may indicate a trace or other tree search data such as the state(s) indicated by prediction node(s), action(s) indicated by action node(s), upper and/or lower bound cost(s) associated with prediction node(s), and/or the like of a branch of the tree that includes the prediction node. In some examples, the estimated cost may include an estimate of the upper bound cost for the prediction node. For example, the estimated upper bound cost may be an estimate of the minimum cost (as would be determined by the cost function) of reaching the termination point from the state indicated by the prediction node. As relates to the loss function given herein, operation 602 may include determining LCTG($b_n$).

The architecture 234 may determine the first estimated cost. In some examples, the architecture 234 may comprise two portions, which may execute at two different times: a tree search setup portion and an active tree search portion. In some examples, tree search setup portion may be executed at the beginning of a tree search before the first prediction node(s) are generated and does not need to be executed again during the tree search until a new path needs to be generated by the vehicle, which may include a new tree search at a subsequent real-world time.

The tree search setup portion may comprise a first machine-learned model and a second machine-learned model. The first machine-learned model may receive environment state data as input and may be trained to output environment features. The environment features output by the first machine-learned model may have no humanly-comprehensible general description, as they may be a tensor full of values that have been trained to reduce the loss discussed herein. However, this tensor does still spatially represent the environment. For example, the environment features may include an embedding. The environment features comprise one or more values that may be associated with particular portion of the environment features that is also associated with a particular portion of the environment. In other words, the environment features may still be indexed by locations in the environment a portion of the environment features may correspond one-to-one with a location in the environment. In some examples, the first machine-learned model may be a convolutional neural network or any other suitable neural network.

The tree search setup portion may further comprise a second machine-learned model that receives track(s) as input (also called dynamic object data) and is trained to determine dynamic features. Similarly to the machine-learned model, the dynamic features generated by the second machine-learned model may not have a specific meaning discernible by humans, due to the nature of the training, but different portions of the dynamic features are associated with different ones of the track(s). For example, the dynamic features may include an embedding. More specifically, the embedding may be encoded as a graph where different nodes represent different object(s) and/or the vehicle and a tensor of hidden features (i.e., a tensor of values generated by the second machine-learned model). Accordingly, a portion of the dynamic features may be associated with one of the track(s). Moreover, the portion of the dynamic features associated with a particular one of the tracks may be associated with a portion of the environment features and, accordingly, a portion of the environment. In some examples, the second machine-learned model may receive the environment features as additional input and determining the dynamic features may be further based at least in part on the environment features. In some examples, the second machine-learned model may comprise a graph-based recursive neural network (GRNN), in which case, the dynamic features may comprise a tensor of embeddings, although any other suitable neural network or transformer may be used.

The active tree search portion of the architecture 234 that conducts the tree search after the pre-processing/setup models have run may comprise a third machine-learned model that may be trained to determine predicted feature based at least in part on the prediction node data, environment features, and/or the dynamic features. The prediction node data may be updated based at least in part on the most recently added layer of the data structure that is generated by the tree search. In some examples, there may be prediction node data for each prediction node for which the architecture is determining an estimated cost. Moreover, determining the prediction node data for a target prediction node may comprise tracing from the target prediction node back to the root node to determine the parent prediction nodes that led to the target prediction node. The prediction node data may additionally or alternatively indicate where in the tree search the target prediction node is and/or a predicted state of the environment, the autonomous vehicle, and/or dynamic object(s) based at least in part on prediction/simulation associated with that target prediction node. The prediction node data may encode or otherwise identify an aggregation of the predicted data from the root node to the parent node of the target prediction node or, in some examples, may indicate the prediction node data associated with the parent node of the target node. In examples where the architecture 234 predicts an estimated cost for each prediction node of a deepest layer of the prediction tree, the prediction node data may comprise prediction node data for each of the prediction nodes of that deepest (explored) layer. In examples where the architecture 234 previously determined an estimated cost associated with a prediction node, the architecture 234 may skip determining an estimated cost associated with such a node. In examples where the prediction node data comprises multiple time steps associated with parent prediction nodes leading up to the target prediction node, the third machine-learned model is configured to handle the input as a time series (e.g., by including different input heads for the different time steps).

In some examples, the third machine-learned model may be initialized based at least in part on the dynamic features determined by the pre-processing model(s). For example, the third machine-learned model may comprise a graph RNN (GRNN) where a node of the GRNN may be associated with a dynamic object or the vehicle itself and a node state may be filled in using the corresponding node state of a node in the dynamic features associated with that dynamic object or the vehicle. This may be repeated for as many object(s) as are represented in the dynamic features. Subsequent nodes associated with the predicted features may be determined by the third machine-learned model based at least in part on the prediction node data and added to the graph that was initialized using the dynamic object features.

In some examples, instead of using the entire environment features, a portion of environment features may be determined to be associated with a predicted location and/or area that an object is predicted to occupy according to the prediction node data. For example, the prediction node data may indicate a position, orientation, and/or portion of the environment occupied by an object, and a corresponding portion of the environment features may be input into the third machine-learned model in association with that prediction node data. In some examples, inputting a portion of the environment features associated with a particular object may include appending the portion of the environment features to a node of a GRNN associated with that object. In some examples, the portion of the environment features input in association with particular prediction node data may include a buffer around the object, such as 0.5 meters, 1 meter, 3 meters, 5 meters, or the like around the portion of the environment associated with the object.

In some examples, the third machine-learned model may comprise a GRNN trained to encode the interactions between the different dynamic object(s) and the vehicle 202 as predicted features. Again, the predicted features may not be humanly-comprehensible, except that they may be indexed spatially according to the environment state data, such as may be represented by an embedding. For example, the GRNN outputs discussed herein may comprise a node associated with a dynamic object and an embedding that encodes the output of the respective ML model. Note that the nodes of GRNNs discussed herein may differ from nodes of the tree search. The nodes of the GRNN are generated by the GRNN's trained functionality, whereas nodes of the tree search are generated according to a tree search algorithm.

The active tree search portion may further comprise an encoder component configured to received the predicted features and dynamic features as input and aggregate them as an encoded output. In some examples, the output of the encoder may be the result of an average polling between the dynamic features and the predicted features, concatenating the dynamic features to the predicted features, mean averaging between the dynamic features and the predicted features, or using a transformer to generate the encoded output. In the latter example, the transformer may be a transformer neural network with self-attention configured to operate on graph(s). Ultimately, the encoder may be invariant for the number of objects represented by the dynamic features and the predicted features, such as a graph transformer network (GTN). In an additional or alternate example, the encoder component may comprise a transformer. Regardless, the encoder component may have parameters that are trained by the loss determined according to the techniques discussed herein.

The output of the encoder component may be provided to a decoder component that projects the encoder output into a feature space to determine estimated cost(s), which may comprise a single estimated cost associated with a prediction node or multiple estimated costs, each of which is associated with a different prediction node. In some examples, the feature space may be bounded by the possible cost estimate outputs.

In some examples, the first machine-learned model, the second machine-learned model, and the third machine-learned model may be portions of a single machine-learned model, referred to herein as the cost estimation architecture or architecture 234. This single machine-learned model may additionally or alternatively include the encoder and/or decoder.

At operation 604, example process 600 may comprise determining, by the machine-learned model, a second estimated cost associated with a root node of the tree, according to any of the techniques discussed herein. In some examples, determining the second estimated cost associated with the root node may comprise determining the estimated cost of reaching the termination point from a state indicated by the root node, which may comprise a current state of the vehicle and/or the environment. As relates to the loss function discussed herein, operation 604 may comprise determining LCTG($b_0$).

At operation 606, example process 600 may comprise determining, by a cost function, a predicted cost for operating the vehicle from the first vehicle state indicated by the prediction node and/or to the termination point, according to any of the techniques discussed herein. In some examples, operation 606 may comprise determining an upper bound cost for the root node based at least in part on backpropagating an upper bound cost determined for the prediction node according to the discussion regarding FIGS. 5A-5C. Determining the upper bound cost for the prediction node may comprise determining the minimum predicted cost from among multiple predicted costs for different candidate actions that start at the first vehicle state indicated by the prediction node. Determining a predicted cost for a candidate action may comprise determining, by the cost function, the transition cost for a candidate action plus the cost(s) of one or more default actions from the candidate action to a termination point plus a terminal cost according to the operations discussed regarding FIGS. 5A-5C. The upper bound cost for the root node may then be determined to be the minimum prediction cost, plus any intervening transition costs of candidate actions for reaching the prediction node associated with the minimum prediction cost. As relates to the loss function discussed herein, operation 606 may comprise determining V($b_0$).

At operation 608, example process 600 may comprise determining a first sub-loss based at least in part on a difference between the second estimated cost and the predicted cost, according to any of the techniques discussed herein. For example, operation 608 may comprise determining a mean squared error, cross-entropy, Wasserstein, or any other suitable loss using the second estimated cost (LCTG ($b_0$)) and the predicted cost for the root node V($b_0$), which may be the updated upper bound cost determined for the root node. As relates to the loss function discussed herein, operation 608 may comprise determining L[V($b_0$), LCTG ($b_0$)].

At operation 610, example process 600 may comprise determining a second sub-loss based at least in part on a difference between the first estimated cost, a third estimated cost determined by the machine-learned model for a future vehicle state following the first vehicle state (e.g., LCTG ($b^{a_{min}}_{n+1}$)) or an expected value of the third estimated cost (e.g., E(LCTG ($b^{a_{min}}_{n+1}$))), and an additional transition cost of an action to reach the future vehicle state (e.g., c($b_n$, $a_{min}$)), according to any of the techniques discussed herein. Since the optimal action cannot or is unlikely to be known without the tree search converging, the minimum transition cost of reaching a next future vehicle state may be used instead. For example, multiple candidate actions may be generated by the planning component that start from the first vehicle state indicated by the prediction node and the cost function may determine a transition cost for each of these candidate actions. The loss function discussed herein may replace the machine-learned model generated estimated cost of the future vehicle state that would be reached by the optimal action, LCTG($b^{a*}_{n+1}$) with determining, by the machine-learned model, the estimated cost associated with the future vehicle state that would be achieved by the lowest cost candidate action as determined from among multiple candidate actions stemming from the prediction node and their transition costs, $$LCTG(b^{a_{min}}_{n+1});$$

and the transition cost of reaching that future vehicle state from the first vehicle state by the optimal action, c($b_n$, a*), may be replaced with the transition cost of the lowest cost candidate action as determined by the cost function, c($b_n$, $a_{min}$).

However, the third estimated cost and/or additional transition cost may be different than if the optimal action were known and the tree search had converged. In order to account for this inaccuracy and to provide a more accurate loss function for training the machine-learned model, example process 600 may further comprise one or both of the following approximations discussed at operations 610(*a*) and 610(*b*) to account for the differences (1) between the estimated cost for the future state achieved by the cheapest candidate action to operate from the prediction node and the cost of the optimal future state that would be achieved by the optimal action; and (2) between the transition cost of the cheapest candidate action to operate from the prediction node and the transition cost of the optimal action.

Accordingly, before adjustment, the second sub-loss may be determined by the following expression.

$$\beta * \sum_{n=0}^{d} \left\| LCTG(b_n) - \gamma * E\left(LCTG(b^{a_{min}}_{n+1})\right) - c(b_n, a_{min}) \right\| \quad (2)$$

where:

β is a value chosen to weigh the second sub-loss (which functionally weighs the extent to which the machine-learned model is trained to learn the magnitude of the cost estimate);

n is the current depth of the tree;

$b_n$ is the prediction node at the current deepest level of the tree, n, (e.g., the prediction node for which an estimated cost was just determined);

d is the maximum depth of the tree search (e.g., which may be associated with the termination point);

$LCTG(b_n)$ is the estimated cost determined by the machine-learned model for the prediction node, i.e., the "first estimated cost;"

γ is a decay or discount factor;

E is the statistical expectation (although if only one prediction node is determined for the layer this may be ignored);

$LCTG(b^{a_{min}}_{n+1})$ is the estimated cost determined by the machine-learned model for the next prediction node given the candidate action, $a_{min}$, generated for the prediction node, $b_n$, with the lowest transition cost to arrive at the future vehicle state indicated by the next prediction node, $b_{n+1}$; from the prediction node; and $c(b_n, a_{min})$ is the transition cost determined by the cost function for the lowest cost candidate action to operate form the prediction node.

Accordingly, determining the difference at operation 610 may comprise determining a difference between the first estimated cost, a third estimated cost determined by the machine-learned model for a future vehicle state following the first vehicle state (that would be achieved by the candidate action having the minimum transition cost to operate from the prediction node) or an expected value of the third estimated cost, and an additional transition cost of an action to reach the future vehicle state (e.g., the minimum transition cost from among the transition costs determined for the candidate actions that are generated by the planning component for the first vehicle state indicated by the prediction node).

At operation 610(a), example process 600 may comprise adjusting the second sub-loss based at least in part on weighting the difference determined at operation 610 based at least in part on a convergence of the tree search, according to any of the techniques discussed herein. Operation 610(a) may comprise determining a weight by which to weight this difference, which may be given as $w(b_n)$ in the following expression:

$$\beta \sum_{n=0}^{d} w(b_n) * \left\| LCTG(b_n) - \gamma * E\left(LCTG\left(b^{a_{min}}_{n+1}\right)\right) - c\left(b_n, a^{min}\right) \right\| \quad (3)$$

where the weight may increase as a difference between the upper bound and the lower bound of the prediction node decreases. In other words, as the upper bound and lower bound get closer to one another as the tree expands, this weight will increase. For example, the weight for the second sub-loss, $w(b_n)$ may be determined based at least in part on:

$$w(b_n) = \frac{x}{\left( \dfrac{UB(b_n) - LB(b_n)}{UB(b_n)} + x \right)} \quad (4)$$

where $UB(b_n)$ is the upper bound cost determined for the prediction node, $b_n$; $LB(b_n)$ is the lower bound cost determined for the prediction node; and x is a magnitude of weight that is to be applied to the second sub-loss for an unconverged prediction node. Accordingly, in examples where operation 610(a) is used to adjust the second sub-loss, the total loss (including the first sub-loss) may be determined according to:

$$L(\text{branch}) = L[V(b_0), LCTG(b_0)] + \quad (5)$$

$$\beta \sum_{n=0}^{d} w(b_n) * \left\| LCTG(b_n) - \gamma * E\left(LCTG\left(b^{a_{min}}_{n+1}\right)\right) - c\left(b_n, a^{min}\right) \right\|$$

However, the formulation given above is for costs determined for a single objective, such as one of safety, progress, comfort, etc. Accordingly, the loss function may be reformulated to account for multiple costs (e.g., where the transition costs, upper bound costs, lower bound costs, etc. are determined for multiple objectives such as two or more of safety, progress, comfort, etc.) as:

$$L(\text{branch}) = \sum_{k=0}^{K} \delta_k \left( L[V_k(b_0), LCTG_k(b_0)] + \quad (6) \right.$$

$$\left. \beta \sum_{n=0}^{d} w_k(b_n) * \left\| LCTG(b_n) - \gamma E\left(LCTG_k\left(b^{a_{min}}_{n+1}\right)\right) - c_k\left(b_n, a^{min}\right) \right\| \right)$$

where $$w_k(b_n) = x / \left((UB_k(b_n) - LB_k(b_n))/UB_k(b_n) + x\right) \quad (7)$$

and where k represents the k-th objective and $\delta_k$ is the weight given to the k-th objective's loss in examples where the different objectives are to be weighted differently. In examples where the loss is to be averaged across the different objectives, $\delta_k$ may be 1/k. Note too that the upper and lower bound costs may differ per objective, as seen in $V_k$, and that the machine-learned model may be trained to estimate costs differently for different objectives, which can be seen in $LCTG_k$. Additionally, note that any of the losses discussed herein may be the same or different as any of the other losses and that they may be any appropriate loss, such as mean squared error, cross-entropy loss, Wasserstein loss, or the like.

At operation 610(b), example process 600 may comprise adjusting the second sub-loss based at least in part on an estimate of a difference between the estimated lowest cost associated with an action for reaching the future vehicle state and a cost associated with an optimal action for reaching the termination point, according to any of the techniques discussed herein. Since the cost associated with the optimal action may be unknown without the tree converging, the difference between the cheapest transition cost and the cost of the optimal action may be approximated by $\alpha'(a^{min}, a^*)$. This approximation may be used to adjust the transition cost determined for the cheapest candidate action in the second sub-loss according to the following equation:

$$L(\text{branch}) = L[V(b_0), LCTG(b_0)] +$$ (8)

$$\beta \sum_{n=0}^{d} \left\| LCTG(b_n) - \gamma E\left(LCTG\left(b_{n+1}^{a_{min}}\right)\right) - c\left(b_n, a^{min}\right) + \alpha'\left(a^{min}, a^*\right) \right\|$$

where $\alpha'$ is the approximation of the difference in cost between the optimal action, $\alpha^*$, and the minimum transition cost action, $\alpha_{min}$. In some examples, this approximation may be determined by multiplying the range or difference between the upper and lower bound cost for the prediction node by a fixed parameter, $\epsilon$, (i.e., $\epsilon(UB(b_n)-LB(b_n))$) where $\epsilon \in [0.5, 0))$ or by randomly sampling a value from between zero and the difference between the upper bound cost and the lower bound cost determined for the prediction node (i.e., the range $[(UB(b_n)-LB(b_n)), 0])$. This works because the cost of the optimal action should be between the upper bound and the lower bound.

However, the formulation given above is for costs determined for a single objective, such as one of safety, progress, comfort, etc. Accordingly, the loss function may be reformulated to account for multiple costs (e.g., where the transition costs, upper bound costs, lower bound costs, etc. are determined for multiple objectives such as two or more of safety, progress, comfort, etc.) as:

$$L(\text{branch}) = \sum_{k=0}^{K} \delta_k \bigg( L[V_k(b_0), LCTG_k(b_0)] +$$ (9)

$$\beta \sum_{n=0}^{d} \left\| LCTG_k(b_n) - \gamma E\left(LCTG_k\left(b_{n+1}^{a_{min}}\right)\right) - c_k\left(b_n, a^{min}\right) + \alpha'_k\left(a^{min}, a^*\right) \right\|$$

where k represents the k-th objective and $\delta_k$ is the weight given to the k-th objective's loss in examples where the different objectives are to be weighted differently. In examples where the loss is to be averaged across the different objectives, $\delta_k$ may be 1/k. Note too that the upper and lower bound costs may differ per objective, as seen in $V_k$, and that the machine-learned model may be trained to estimate costs differently for different objectives, which can be seen in $LCTG_k$. Additionally, note that any of the losses discussed herein may be the same or different as any of the other losses and that they may be any appropriate loss, such as mean squared error, cross-entropy loss, Wasserstein loss, or the like.

In some examples, one of operation 610(*a*) or operation 610(*b*) may be used or both may be used, such as by alternating their use for subsequent prediction nodes or for subsequent epochs of training of the machine-learned model.

At operation 612, example process 600 may comprise modifying, based at least in part on the first sub-loss and the second sub-loss, a parameter of the machine-learned model, according to any of the techniques discussed herein. In some examples, operation 612 may comprise summing the first sub-loss and the second sub-loss. For example, operation 612 may comprise determining a loss based at least in part on an output of the machine-learned model (e.g., architecture 234) using at least one of equations (4) and (5), (6) and (7), (8), or (9). Operation 612 may comprise altering one or more parameters of the machine-learned model to reduce the loss, such as according to a gradient descent process. The parameter may comprise a weight, bias, or other such parameter of the machine-learned model. In other words, if the updated machine-learned model were to re-determine the estimated cost for the same root node and/or prediction node again with the exact same conditions, the loss determined according to the techniques above would be less.

At operation 614, example process 600 may comprise transmitting the machine-learned model to a vehicle, according to any of the techniques discussed herein. For example, the vehicle may install the machine-learned model and may use the machine-learned model as part of a tree search for determining a trajectory or set of trajectories for controlling the vehicle.

Example Clauses

A: A system comprising: one or more processors; and a memory storing processor-executable instructions that, when executed by the one or more processors, cause the system to perform operations comprising: determining, by a machine-learned model, a first estimated cost of moving a vehicle from a first vehicle state indicated by a prediction node of a tree to a termination point, the first estimated cost indicating an estimated lowest cost of reaching the termination point from the first vehicle state and associated with at least one of safety, progress along a route, or passenger comfort associated with reaching the termination point; determining, by the machine-learned model, a second estimated cost associated with a root node of the tree, the root node of the tree indicating a current state of the vehicle; determining, by a cost function, a predicted cost for moving the vehicle from the root node to the termination point, the predicted cost indicating an upper bound cost associated with the root node; determining a first sub-loss based at least in part on a difference between the second estimated cost and the predicted cost; determining a second sub-loss based at least in part on a difference between the first estimated cost, a third estimated cost determined by the machine-learned model for a future vehicle state following the first vehicle state or an expected value of the third estimated cost, and a transition cost of an action to move from the future vehicle state; modifying, based at least in part on the first sub-loss and the second sub-loss, a parameter of the machine-learned model; and transmitting the machine-learned model to the vehicle for the vehicle to determine a trajectory for controlling the vehicle based at least in part on an output of the machine-learned model.

B: The system of paragraph A, wherein determining the second sub-loss further comprises weighting, based at least in part on a convergence of a tree search that generated the tree, the difference between the first estimated cost, the third estimated cost or the expected value of the third estimated cost, and the transition cost of the action to move from the future vehicle state.

C: The system of paragraph B, wherein weighting based at least in part on the convergence comprises determining increasing a weight as a difference between a second upper bound cost determined for the prediction node and a lower bound cost determined for the prediction node decreases.

D: The system of any one of paragraphs A-C, wherein determining the second sub-loss further comprises adjusting the second sub-loss based at least in part on an estimate of a difference between the estimated lowest cost associated with the action for moving from the future vehicle state to the termination point and a cost associated with an optimal action for reaching the termination point.

E: The system of paragraph D, wherein determining the estimate of the difference between the estimated lowest cost and the cost associated with the optimal action comprises one or more of: multiplying a constant by the difference between a second upper bound cost determined for the prediction node and a lower bound cost determined for the prediction node, or randomly sampling, as the estimate, a value between zero and the second upper bound cost minus the lower bound cost.

F: One or more non-transitory computer-readable media storing processor-executable instructions that, when executed by one or more processors, cause one or more processors to perform operations comprising: determining, by a machine-learned model, a first estimated cost of operating a vehicle from a first vehicle state indicated by a prediction node of a tree to a termination point, the first estimated cost indicating an estimated lowest cost of reaching the termination point from the first vehicle state; determining, by the machine-learned model, a second estimated cost associated with a root node of the tree; determining, by a cost function, a predicted cost for operating the vehicle from the root node to the termination point; determining a first sub-loss based at least in part on a difference between the second estimated cost and the predicted cost; determining a second sub-loss based at least in part on a difference between the first estimated cost, a third estimated cost determined by the machine-learned model for a future vehicle state following the first vehicle state or an expected value of the third estimated cost, and a transition cost of an action to operate from the future vehicle state; and modifying, based at least in part on the first sub-loss and the second sub-loss, a parameter of the machine-learned model.

G: The one or more non-transitory computer-readable media of paragraph F, wherein determining the second sub-loss further comprises weighting, based at least in part on a convergence of a tree search that generated the tree, the difference between the first estimated cost, the third estimated cost or the expected value of the third estimated cost, and the transition cost of the action to operate from the future vehicle state.

H: The one or more non-transitory computer-readable media of paragraph G, wherein weighting based at least in part on the convergence comprises determining increasing a weight as a difference between a upper bound cost determined for the prediction node and a lower bound cost determined for the prediction node decreases.

I: The one or more non-transitory computer-readable media of any one of paragraphs F-H, wherein determining the second sub-loss further comprises adjusting the second sub-loss based at least in part on an estimate of a difference between the estimated lowest cost associated with the action for operating from the future vehicle state to the termination point and a cost associated with an optimal action for reaching the termination point.

J: The one or more non-transitory computer-readable media of paragraph I, wherein determining the estimate of the difference between the estimated lowest cost and the cost associated with the optimal action comprises one or more of: multiplying a constant by the difference between an upper bound cost determined for the prediction node and a lower bound cost determined for the prediction node, or randomly sampling, as the estimate, a value between zero and the upper bound cost minus the lower bound cost.

K: The one or more non-transitory computer-readable media of paragraph J, wherein: determining the upper bound cost comprises: determining, using the cost function, a cost of a default action that starts from an end of the action and continues until the termination point is reached; determining, by the cost function, the transition cost associated with the action; determining a total prediction cost based at least in part on a summation of the cost of the default action and the transition cost of the action; and determining the upper bound cost to be the total prediction cost based at least in part on determining the total prediction cost is a minimum prediction cost from among multiple prediction costs; and determining the lower bound cost comprises determining a minimum total transition cost of a child branch that depends from the prediction node.

L: The one or more non-transitory computer-readable media of paragraph K, wherein determining the total prediction cost further comprises: determining a terminal cost associated with a last prediction node in the tree associated with the termination point and reached by the default action; and summing the terminal cost with the cost of the default action and the transition cost of the action.

M: The one or more non-transitory computer-readable media of any one of paragraphs F-L, wherein the transition cost of the action to reach the future vehicle state is a minimum transition cost from among transition costs determined for different candidate actions for operating from the first vehicle state.

N: The one or more non-transitory computer-readable media of any one of paragraphs F-M, wherein determining the predicted cost comprises determining an upper bound cost for operating from a current state indicate by the root node and determining the upper bound cost comprises: determining multiple second predicted costs for operating from the vehicle state indicated by the prediction node; determining a minimum second predicted cost from among the multiple second predicted costs; and summing the minimum second predicted cost with an intervening terminal cost determined for a second action between the current state indicated by the root node and the first vehicle state indicated by the prediction node.

O: The one or more non-transitory computer-readable media of paragraph N, wherein determining the minimum second predicted cost comprises: determining, using the cost function, a cost of a default action that starts from an end of the action and continues until the termination point is reached; determining, by the cost function, the transition cost associated with the action; determining, by a second cost function or a second machine-learned model, a terminal cost associated with a last prediction node in the tree associated with the termination point and reached by the default action; and determining a total prediction cost based at least in part on a summation of the cost of the default action, the transition cost of the action, and the terminal cost.

P: A method comprising: determining, by a machine-learned model, a first estimated cost of operating a vehicle from a first vehicle state indicated by a prediction node of a tree to a termination point, the first estimated cost indicating an estimated lowest cost of reaching the termination point from the first vehicle state; determining, by the machine-learned model, a second estimated cost associated with a root node of the tree; determining, by a cost function, a predicted cost for operating the vehicle from the root node to the termination point; determining a first sub-loss based at least in part on a difference between the second estimated cost and the predicted cost; determining a second sub-loss based at least in part on a difference between the first estimated cost, a third estimated cost determined by the machine-learned model for a future vehicle state following the first vehicle state or an expected value of the third estimated cost, and a transition cost of an action to operate from the future vehicle state; and modifying, based at least in part on the first sub-loss and the second sub-loss, a parameter of the machine-learned model.

Q: The method of paragraph P, wherein determining the second sub-loss further comprises weighting, based at least in part on a convergence of a tree search that generated the tree, the difference between the first estimated cost, the third estimated cost or the expected value of the third estimated cost, and the transition cost of the action to operate from the future vehicle state.

R: The method of paragraph Q, wherein weighting based at least in part on the convergence comprises determining increasing a weight as a difference between a upper bound cost determined for the prediction node and a lower bound cost determined for the prediction node decreases.

S: The method of any one of paragraphs P-R, wherein determining the second sub-loss further comprises adjusting the second sub-loss based at least in part on an estimate of a difference between the estimated lowest cost associated with the action for operating from the future vehicle state to the termination point and a cost associated with an optimal action for reaching the termination point.

T: The method of paragraph S, wherein determining the estimate of the difference between the estimated lowest cost and the cost associated with the optimal action comprises one or more of: multiplying a constant by the difference between an upper bound cost determined for the prediction node and a lower bound cost determined for the prediction node, or randomly sampling, as the estimate, a value between zero and the upper bound cost minus the lower bound cost.

U: The method of paragraph T, wherein: determining the upper bound cost comprises: determining, using the cost function, a cost of a default action that starts from an end of the action and continues until the termination point is reached; determining, by the cost function, the transition cost associated with the action; determining a total prediction cost based at least in part on a summation of the cost of the default action and the transition cost of the action; and determining the upper bound cost to be the total prediction cost based at least in part on determining the total prediction cost is a minimum prediction cost from among multiple prediction costs; and determining the lower bound cost comprises determining a minimum total transition cost of a child branch that depends from the prediction node.

V: The method of paragraph U, wherein determining the total prediction cost further comprises: determining a terminal cost associated with a last prediction node in the tree associated with the termination point and reached by the default action; and summing the terminal cost with the cost of the default action and the transition cost of the action.

W: The method of any one of paragraphs P-V, wherein the transition cost of the action to reach the future vehicle state is a minimum transition cost from among transition costs determined for different candidate actions for operating from the first vehicle state.

X: The method of any one of paragraphs P-W, wherein determining the predicted cost comprises determining an upper bound cost for operating from a current state indicate by the root node and determining the upper bound cost comprises: determining multiple second predicted costs for operating from the prediction node; determining a minimum second predicted cost from among the multiple second predicted costs; and summing the minimum second predicted cost with an intervening terminal cost determined for a second action between the current state indicated by the root node and the first vehicle state indicated by the prediction node.

Y: The method of paragraph X, wherein determining the minimum second predicted cost comprises: determining, using the cost function, a cost of a default action that starts from an end of the action and continues until the termination point is reached; determining, by the cost function, the transition cost associated with the action; determining, by a second cost function or a second machine-learned model, a terminal cost associated with a last prediction node in the tree associated with the termination point and reached by the default action; and determining a total prediction cost based at least in part on a summation of the cost of the default action, the transition cost of the action, and the terminal cost.

Z: The system of paragraph A, wherein: the operations further comprise: receiving environment state data indicating static characteristics of an environment associated with a vehicle; and receiving dynamic object data indicating at least one of a historical or a current state of at least one of a dynamic object or the vehicle; and the machine-learned model determines the first estimated cost based at least in part on at least one of the environment state data or the dynamic object data.

While the example clauses described above are described with respect to one particular implementation, it should be understood that, in the context of this document, the content of the example clauses can also be implemented via a method, device, system, computer-readable medium, and/or another implementation. Additionally, any of examples A-Z may be implemented alone or in combination with any other one or more of the examples A-Z.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. Such processes, or any portion thereof, may be performed iteratively in that any or all of the steps may be repeated. Of course, the disclosure is not meant to be so limiting and, as such, any process performed iteratively may comprise, in some examples, performance of the steps a single time.

Conditional language such as, among others, "may," "could," "may" or "might," unless specifically stated otherwise, are understood within the context to indicate that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a," "an" or other similar articles means singular and/or plural. When referring to a collection of items as a "set," it should be understood that the definition may include, but is not limited to, the common understanding of the term in mathematics to include any number of items including a null set (0), 1, 2, 3, . . . up to and including an infinite set.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processors; and
a memory storing processor-executable instructions that, when executed by the one or more processors, cause the system to perform operations comprising:
determining, by a machine-learned model, a first estimated cost of moving a vehicle from a first vehicle state indicated by a prediction node of a tree to a termination point, the first estimated cost indicating an estimated lowest cost of reaching the termination point from the first vehicle state and associated with at least one of safety, progress along a route, or passenger comfort associated with reaching the termination point;
determining, by the machine-learned model, a second estimated cost associated with a root node of the tree, the root node of the tree indicating a current state of the vehicle;
determining, by a cost function, a predicted cost for moving the vehicle from the root node to the termination point, the predicted cost indicating an upper bound cost associated with the root node;
determining a first sub-loss based at least in part on a difference between the second estimated cost and the predicted cost;
determining a second sub-loss based at least in part on a difference between the first estimated cost, a third estimated cost determined by the machine-learned model for a future vehicle state following the first vehicle state or an expected value of the third estimated cost, and a transition cost of an action to move from the future vehicle state;
modifying, based at least in part on the first sub-loss and the second sub-loss, a parameter of the machine-learned model; and
transmitting the machine-learned model to the vehicle for the vehicle to determine a trajectory for controlling the vehicle based at least in part on an output of the machine-learned model.

2. The system of claim 1, wherein determining the second sub-loss further comprises weighting, based at least in part on a convergence of a tree search that generated the tree, the difference between the first estimated cost, the third estimated cost or the expected value of the third estimated cost, and the transition cost of the action to move from the future vehicle state.

3. The system of claim 2, wherein weighting based at least in part on the convergence comprises determining increasing a weight as a difference between a second upper bound cost determined for the prediction node and a lower bound cost determined for the prediction node decreases.

4. The system of claim 1, wherein determining the second sub-loss further comprises adjusting the second sub-loss based at least in part on an estimate of a difference between the estimated lowest cost associated with the action for moving from the future vehicle state to the termination point and a cost associated with an optimal action for reaching the termination point.

5. The system of claim 4, wherein determining the estimate of the difference between the estimated lowest cost and the cost associated with the optimal action comprises one or more of:
multiplying a constant by a difference between a second upper bound cost determined for the prediction node and a lower bound cost determined for the prediction node, or
randomly sampling, as the estimate, a value between zero and the second upper bound cost minus the lower bound cost.

6. One or more non-transitory computer-readable media storing processor-executable instructions that, when executed by one or more processors, cause the one or more processors to perform operations comprising:
determining, by a machine-learned model, a first estimated cost of operating a vehicle from a first vehicle state indicated by a prediction node of a tree to a termination point, the first estimated cost indicating an estimated lowest cost of reaching the termination point from the first vehicle state;
determining, by the machine-learned model, a second estimated cost associated with a root node of the tree;
determining, by a cost function, a predicted cost for operating the vehicle from the root node to the termination point;
determining a first sub-loss based at least in part on a difference between the second estimated cost and the predicted cost;

determining a second sub-loss based at least in part on a difference between the first estimated cost, a third estimated cost determined by the machine-learned model for a future vehicle state following the first vehicle state or an expected value of the third estimated cost, and a transition cost of an action to operate from the future vehicle state; and modifying, based at least in part on the first sub-loss and the second sub-loss, a parameter of the machine-learned model.

7. The one or more non-transitory computer-readable media of claim 6, wherein determining the second sub-loss further comprises weighting, based at least in part on a convergence of a tree search that generated the tree, the difference between the first estimated cost, the third estimated cost or the expected value of the third estimated cost, and the transition cost of the action to operate from the future vehicle state.

8. The one or more non-transitory computer-readable media of claim 7, wherein weighting based at least in part on the convergence comprises determining increasing a weight as a difference between a upper bound cost determined for the prediction node and a lower bound cost determined for the prediction node decreases.

9. The one or more non-transitory computer-readable media of claim 6, wherein determining the second sub-loss further comprises adjusting the second sub-loss based at least in part on an estimate of a difference between the estimated lowest cost associated with the action for operating from the future vehicle state to the termination point and a cost associated with an optimal action for reaching the termination point.

10. The one or more non-transitory computer-readable media of claim 9, wherein determining the estimate of the difference between the estimated lowest cost and the cost associated with the optimal action comprises one or more of:

multiplying a constant by the difference between an upper bound cost determined for the prediction node and a lower bound cost determined for the prediction node, or randomly sampling, as the estimate, a value between zero and the upper bound cost minus the lower bound cost.

11. The one or more non-transitory computer-readable media of claim 10, wherein:

determining the upper bound cost comprises:

determining, using the cost function, a cost of a default action that starts from an end of the action and continues until the termination point is reached;

determining, by the cost function, the transition cost associated with the action;

determining a total prediction cost based at least in part on a summation of the cost of the default action and the transition cost of the action; and determining the upper bound cost to be the total prediction cost based at least in part on determining the total prediction cost is a minimum prediction cost from among multiple prediction costs; and determining the lower bound cost comprises determining a minimum total transition cost of a child branch that depends from the prediction node.

12. The one or more non-transitory computer-readable media of claim 11, wherein determining the total prediction cost further comprises:

determining a terminal cost associated with a last prediction node in the tree associated with the termination point and reached by the default action; and summing the terminal cost with the cost of the default action and the transition cost of the action.

13. The one or more non-transitory computer-readable media of claim 6, wherein the transition cost of the action to reach the future vehicle state is a minimum transition cost from among transition costs determined for different candidate actions for operating from the first vehicle state.

14. The one or more non-transitory computer-readable media of claim 6, wherein determining the predicted cost comprises determining an upper bound cost for operating from a current state indicate by the root node and determining the upper bound cost comprises:

determining multiple second predicted costs for operating from the first vehicle state indicated by the prediction node;

determining a minimum second predicted cost from among the multiple second predicted costs; and summing the minimum second predicted cost with an intervening terminal cost determined for a second action between the current state indicated by the root node and the first vehicle state indicated by the prediction node.

15. The one or more non-transitory computer-readable media of claim 14, wherein determining the minimum second predicted cost comprises:

determining, using the cost function, a cost of a default action that starts from an end of the action and continues until the termination point is reached;

determining, by the cost function, the transition cost associated with the action;

determining, by a second cost function or a second machine-learned model, a terminal cost associated with a last prediction node in the tree associated with the termination point and reached by the default action; and determining a total prediction cost based at least in part on a summation of the cost of the default action, the transition cost of the action, and the terminal cost.

16. A method comprising:

determining, by a machine-learned model, a first estimated cost of operating a vehicle from a first vehicle state indicated by a prediction node of a tree to a termination point, the first estimated cost indicating an estimated lowest cost of reaching the termination point from the first vehicle state;

determining, by the machine-learned model, a second estimated cost associated with a root node of the tree;

determining, by a cost function, a predicted cost for operating the vehicle from the root node to the termination point;

determining a first sub-loss based at least in part on a difference between the second estimated cost and the predicted cost;

determining a second sub-loss based at least in part on a difference between the first estimated cost, a third estimated cost determined by the machine-learned model for a future vehicle state following the first vehicle state or an expected value of the third estimated cost, and a transition cost of an action to operate from the future vehicle state; and modifying, based at least in part on the first sub-loss and the second sub-loss, a parameter of the machine-learned model.

17. The method of claim 16, wherein determining the second sub-loss further comprises weighting, based at least in part on a convergence of a tree search that generated the tree, the difference between the first estimated cost, the third estimated cost or the expected value of the third estimated cost, and the transition cost of the action to operate from the future vehicle state.

18. The method of claim 17, wherein weighting based at least in part on the convergence comprises determining increasing a weight as a difference between a upper bound cost determined for the prediction node and a lower bound cost determined for the prediction node decreases.

19. The method of claim 16, wherein determining the second sub-loss further comprises adjusting the second sub-loss based at least in part on an estimate of a difference between the estimated lowest cost associated with the action for operating from the future vehicle state to the termination point and a cost associated with an optimal action for reaching the termination point.

20. The method of claim 19, wherein determining the estimate of the difference between the estimated lowest cost and the cost associated with the optimal action comprises one or more of:

multiplying a constant by the difference between an upper bound cost determined for the prediction node and a lower bound cost determined for the prediction node, or randomly sampling, as the estimate, a value between zero and the upper bound cost minus the lower bound cost.

\* \* \* \* \*